(12) United States Patent
Guissin et al.

(10) Patent No.: US 9,407,819 B2
(45) Date of Patent: Aug. 2, 2016

(54) SYSTEM AND METHOD FOR MULTIDIRECTIONAL IMAGING

(75) Inventors: Rami Guissin, Beit Yanai (IL); Eitan Lavi, Hadera (IL)

(73) Assignee: DVP TECHNOLOGIES LTD., Tel Aviv (IL)

( * ) Notice: Subject to any disclaimer, the term of this patent is extended or adjusted under 35 U.S.C. 154(b) by 0 days.

(21) Appl. No.: 14/130,085

(22) PCT Filed: Jul. 1, 2012

(86) PCT No.: PCT/IL2012/050228
§ 371 (c)(1),
(2), (4) Date: Dec. 30, 2013

(87) PCT Pub. No.: WO2013/001540
PCT Pub. Date: Jan. 3, 2013

(65) Prior Publication Data
US 2014/0132804 A1    May 15, 2014

(30) Foreign Application Priority Data

Jun. 30, 2011  (IL) .......................................... 213860
Aug. 4, 2011   (IL) .......................................... 214457

(51) Int. Cl.
| | |
|---|---|
| H04N 5/232 | (2006.01) |
| G02B 27/10 | (2006.01) |
| G08B 13/196 | (2006.01) |
| H04N 7/18 | (2006.01) |
| G02B 27/14 | (2006.01) |
| G01C 11/02 | (2006.01) |
| G02B 23/24 | (2006.01) |
| G03B 37/04 | (2006.01) |
| G02B 13/06 | (2006.01) |
| H04N 5/225 | (2006.01) |

(52) U.S. Cl.
CPC ............ *H04N 5/23238* (2013.01); *G01C 11/02* (2013.01); *G02B 13/06* (2013.01); *G02B 23/2407* (2013.01); *G02B 23/2484* (2013.01); *G02B 27/1066* (2013.01); *G02B 27/1086* (2013.01); *G02B 27/141* (2013.01); *G03B 37/04* (2013.01); *G08B 13/1963* (2013.01); *G08B 13/19602* (2013.01); *G08B 13/19645* (2013.01); *H04N 7/188* (2013.01); *H04N 5/2254* (2013.01); *H04N 2005/2255* (2013.01)

(58) Field of Classification Search
CPC .............. H04N 5/23212; H04N 5/374; H04N 5/23238; H04N 5/2259; H04N 5/23229
See application file for complete search history.

(56) References Cited

U.S. PATENT DOCUMENTS 4,967,264 A * 10/1990 Parulski et al. ................ 348/271
5,218,345 A     6/1993 Muller et al.
(Continued)

FOREIGN PATENT DOCUMENTS

| WO | 2007101183 A2 | 9/2007 |
| WO | 2008129552 A1 | 10/2008 |
| WO | 2009144707 A1 | 12/2009 |

OTHER PUBLICATIONS

PCT/IL2012/050228 "International Search Report" Oct. 16, 2012.

*Primary Examiner* — Ahmed A Berhan
(74) *Attorney, Agent, or Firm* — Browdy and Neimark, PLLC

(57) ABSTRACT

An imaging device is provided, comprising a multidirectional imaging unit defining a plurality of fields of view (FOVs), a sensor unit, and guiding optics. The multidirectional imaging unit is configured for collecting a plurality of electromagnetic (EM) radiation portions from a plurality of scenes, each scene being imaged with a respective FOV. The sensor is configured for receiving EM radiation and generating image data indicative thereof. The guiding optics is configured for receiving at least a part of the collected EM radiation portions and directing them onto the sensor unit.

12 Claims, 32 Drawing Sheets

(56) References Cited

U.S. PATENT DOCUMENTS

| | | |
|---|---|---|
| 6,734,911 B1 | 5/2004 | Lyons |
| 7,835,074 B2 | 11/2010 | Jacobsen et al. |
| 2006/0029377 A1* | 2/2006 | Stavely et al. .................. 396/54 |
| 2006/0187322 A1* | 8/2006 | Janson et al. ............ 348/240.99 |
| 2008/0174670 A1* | 7/2008 | Olsen et al. ................ 348/222.1 |
| 2009/0014657 A1 | 1/2009 | Cole |
| 2010/0283842 A1* | 11/2010 | Guissin et al. .................. 348/68 |

\* cited by examiner

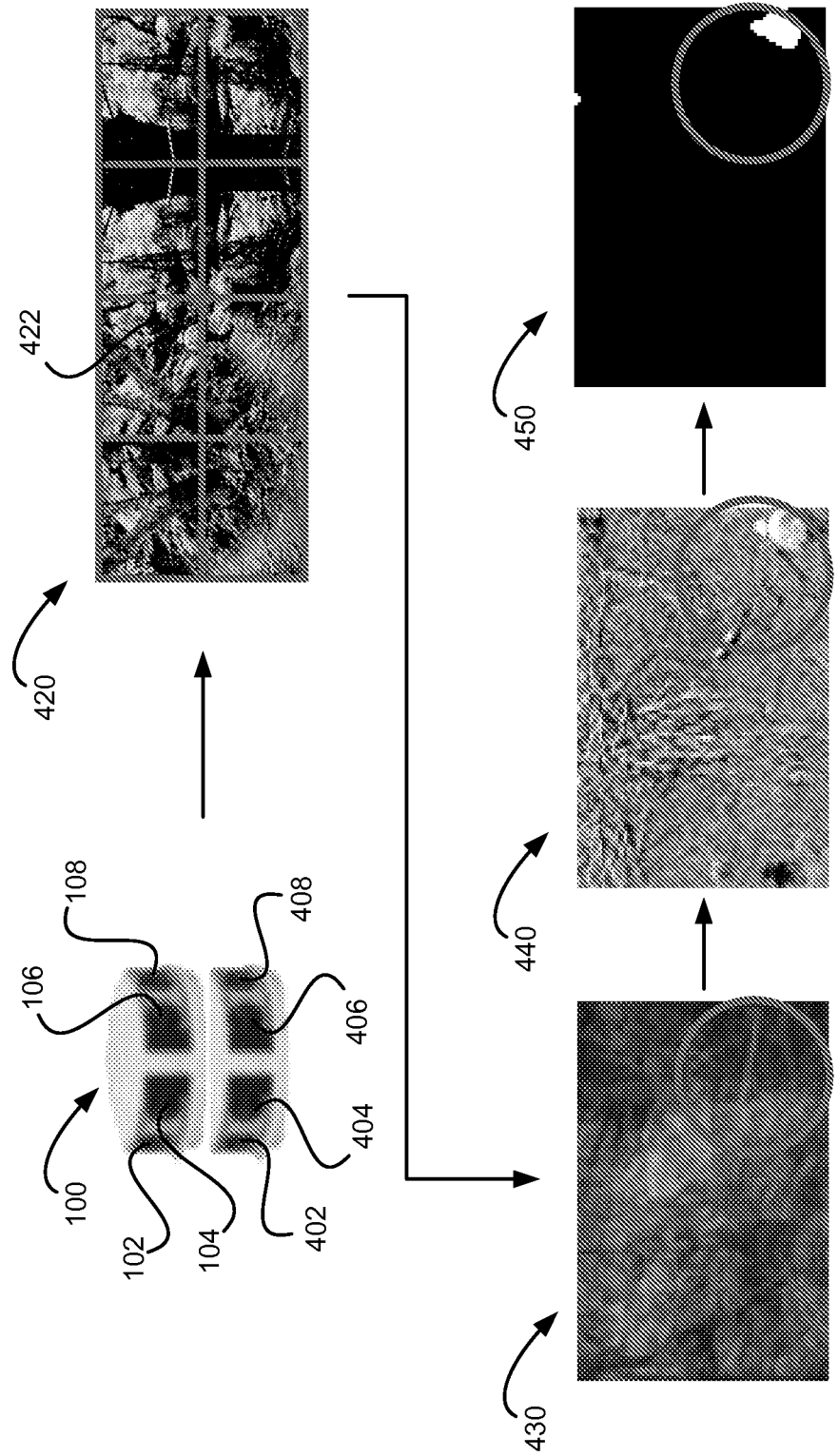

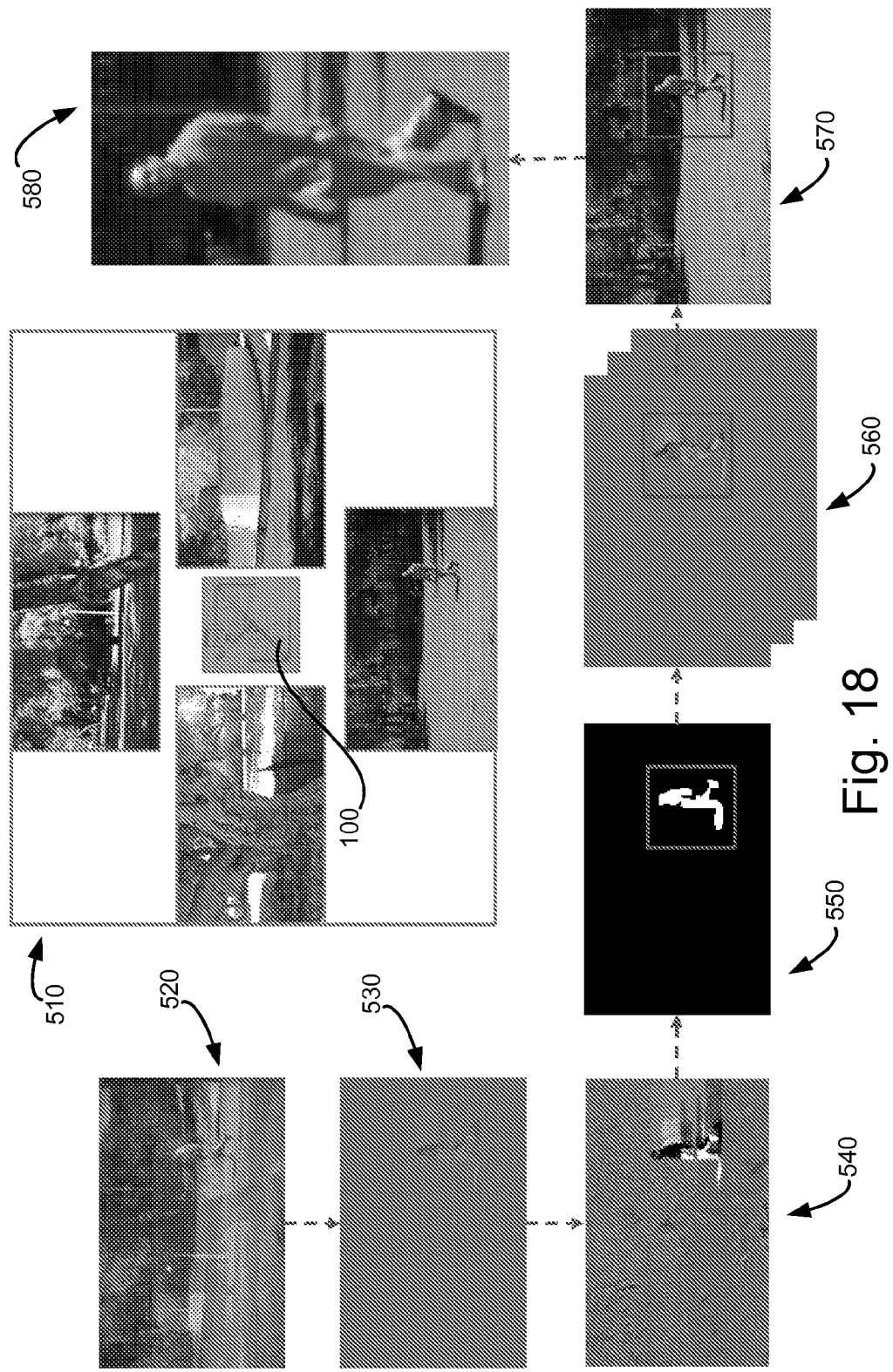

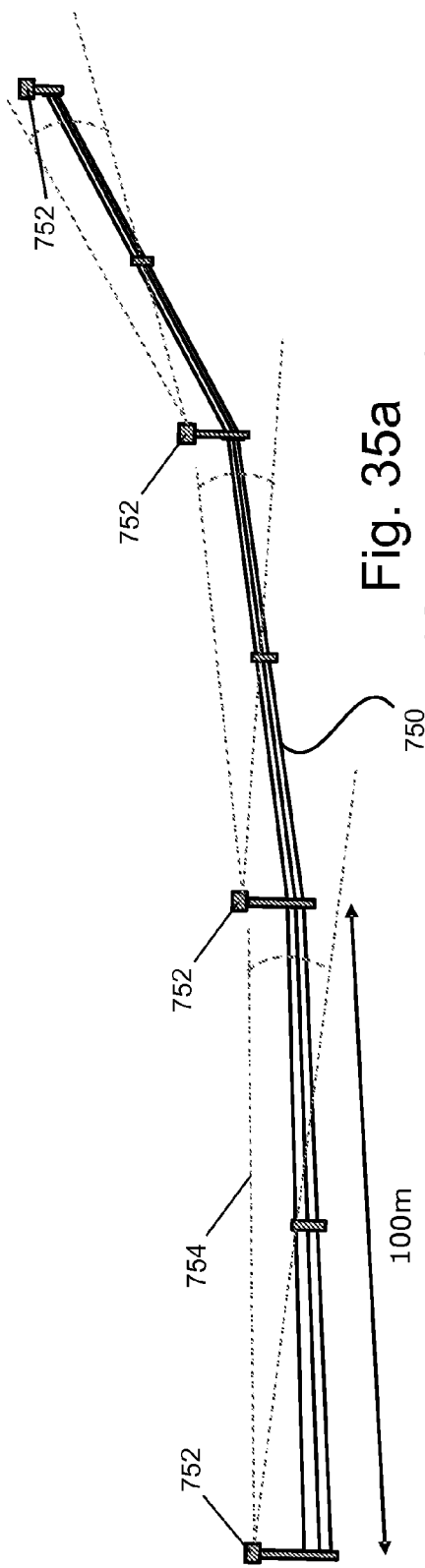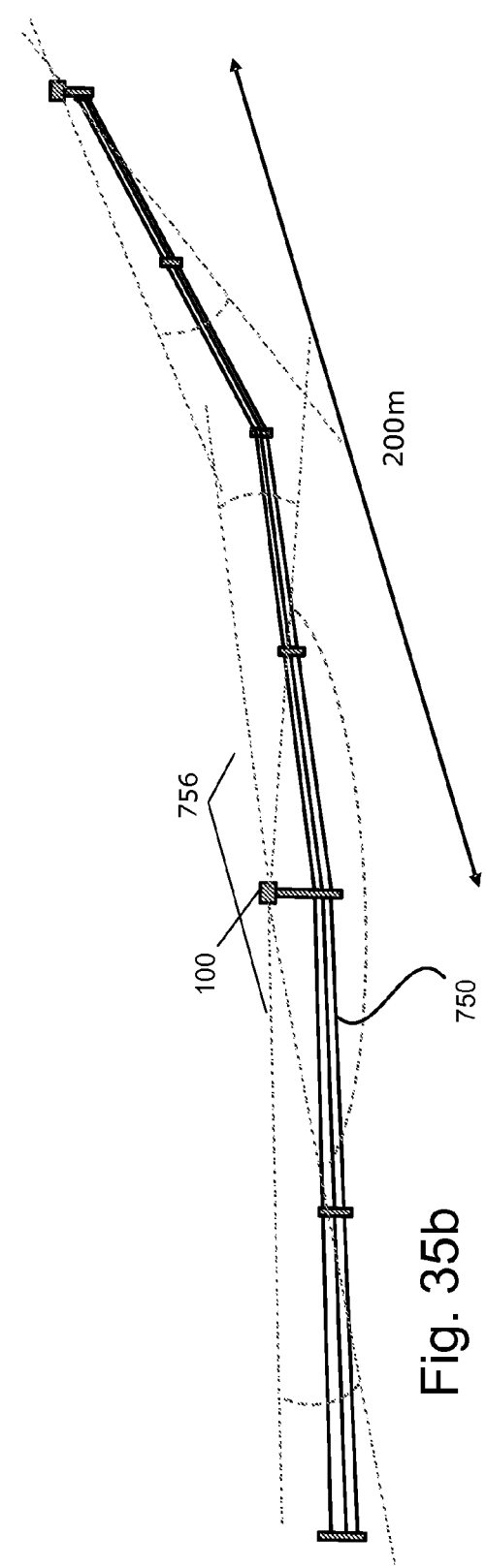

SYSTEM AND METHOD FOR MULTIDIRECTIONAL IMAGING

The present invention relates to the field imaging, and more particularly, to optical devices, sensors, and optionally image processing techniques for imaging with multiple fields of view.

BACKGROUND

Various applications require the viewing and monitoring of a large field of regard, with high resolution and at low cost. Such requirements may also include miniaturized device dimensions and low power consumption.

Moreover, the imaged scenes may need to be processed, in order to identify certain objects or events therein. For example, in some monitoring applications, scene changes and moving objects are identified, requiring rapid rate coverage for detection and scene analysis. In medical applications, diagnostic requirements often include rapid viewing of large field of regard while seeking very small anomalies and irregularities. The addition of imagers and image processors to the viewing/monitoring applications may increase the size, cost, and/or power of the imaging systems.

WO 2008/129552, assigned to the assignee of the present application, describes a method and system for monitoring a field of regard. According to this technique, at least a part of a field of regard is imaged by concurrently collecting a plurality of light components propagating from a plurality of zones, respectively, located within the field of regard, a combined collected light beam is produced, and corresponding data is generated being indicative of a combined image of the at least part of the field of regard formed by the collected light components. This image data indicative of the combined image data is processed and analyzed, and if existence of a certain condition or event is identified in the image data, a corresponding control signal is generated.

GENERAL DESCRIPTION

The present invention is aimed at providing an imaging device which is able to image a scene or scenes with multiple fields of view, while requiring a decreased amount of optical and sensing components. In this manner, a size, cost, and/or power consumption of the device can be reduced.

In some embodiments of the present invention, an imaging device is provided, including an imaging unit (optics), a single electromagnetic (EM) sensor, configured for receiving from different scenes, which are within a plurality of fields of view (FOVs) of the device defined by the imaging unit. Some software and/or hardware utilities may be used in conjunction with the device of the present invention, in order to detect certain events (such as motion or firing of a weapon, for example) and locate their source.

The advantage of a reduction in the number of sensors is twofold. First, the size, cost, and/or power consumption of the device can be reduced. Second, the amount of image data to be analyzed is reduced, as image data is created by a reduced number of sensors. Therefore, the image processing required to identify desired events may be simplified as well.

Therefore, according to some embodiments of the present invention, there is provided an imaging device comprising: a multidirectional imaging unit defining a plurality of fields of view (FOVs) and being configured for collecting a plurality of electromagnetic (EM) radiation portions from a plurality of scenes, each scene being imaged with a respective FOV; a sensor unit comprising at least one sensor configured for receiving EM radiation and generating image data indicative thereof; and guiding optics configured for receiving at least a part of the collected EM radiation portions and directing them onto the sensor unit.

In a variant, the guiding optics is configured for guiding at least part of the collected EM radiation portion from each FOV onto a respective section of the sensor. Optionally, the guiding optics comprises a plurality of deflectors each located in an optical path of propagation of the respective collected EM radiation portion and being configured for directing at least part of said collected EM radiation portion onto the respective section of the sensor. Optionally the guiding optics includes a plurality of refractive units configured for focusing each of the collected EM radiation portions onto the respective section of the sensor.

In another variant, the guiding optics is configured for guiding at least part of the collected EM radiation portions from at least some of the FOVs onto same section of the sensor. The guiding optics may comprise at least one beam splitter, and/or comprises at least one deflector.

According to some embodiments of the present invention, the guiding optics further comprises a plurality of optical filters, each optical filter being associated with one of the FOVs and being configured for filtering the EM radiation portion from the corresponding FOV in a unique manner. The optical filters may band-pass filters, each configured for transmitting a unique range of wavelengths and blocking all others. The optical filters may be diffraction gratings, each diffraction grating being oriented at a unique angle.

In a variant, the guiding optics further comprises a plurality of temporal filters configured for selectively preventing the EM radiation portions from one or more of the FOVs from reaching the sensor at different times. Optionally, the temporal filters comprise a plurality of controllably movable opaque shutters. Optionally, the temporal filter comprises a plurality of controllably movable beam splitters.

According to some embodiments of the present invention, the sensor unit comprises a plurality of sensors, the guiding optics being configured for guiding at least part of the collected EM radiation from one or more of the FOVs onto all the sensors, such that each sensor receives at least part of the EM radiation collected from one or more of the FOVs.

Optionally, the device further comprises a plurality of refractive units, each refractive unit being associated with the respective sensor and being configured for focusing EM radiation received from the guiding optics onto the respective sensor.

In a variant, at least a set of the sensors is sized and positioned such that each sensor of the set receives EM radiation from a respective sector of at least two of the FOVs. Optionally, the sectors of the FOVs corresponding to the respective sensors are contiguous sectors.

In another variant, the device comprises at least one light source configured for illuminating one or more of the scenes within the FOVs.

In another variant, the multidirectional imaging unit comprises a plurality of light collecting elements arranged in a spaced apart relation on an outer surface of a housing of the imaging unit. The light collecting elements may comprise lens elements. Optionally, the light collecting elements comprise apertures or optical windows made in the outer surface of the housing In yet another variant, the device comprises one or more objective lens arrangements located in an optical path of EM radiation propagating from the guiding optics to the sensor unit.

According to an aspect of some embodiments of the present invention, there is provided an imaging system comprising: a device for multidirectional imaging as described above; and a control unit configured for receiving image data from the sensor unit, processing and analyzing the image data and generating data indicative of a certain condition in one or more of the FOVs.

In a variant, the guiding optics is configured for guiding EM radiation from each FOV onto a respective section of the sensor, and the control unit is configured for identifying the FOV that generated image data sporting the identified condition, by locating the section of the sensor which generated the imaged data sporting the condition.

In another variant, the guiding optics is configured for guiding EM radiation from different FOVs onto the same section of the sensor, the guiding optics further comprising a plurality of optical filters, each optical filter being associated with one of the FOVs and being configured for filtering the EM radiation collected from each FOV in a unique manner. The control unit is configured for determining the FOV corresponding to the identified condition, by identifying the unique filtering of the electromagnetic radiation sporting the condition.

In a further variant, the guiding optics is configured for guiding EM radiation from different scenes onto the same section of the sensor, the guiding optics further comprising a plurality of temporal filters configured for selectively preventing EM radiation from one, or more of the FOVs from reaching the sensor at different times. The control unit is configured for determining the FOV corresponding to the identified condition, by identifying a time point in which the EM radiation that generated the imaged data sporting the condition was received.

In yet another variant, the guiding optics is configured for guiding EM radiation from different light collecting elements onto the same section of the sensor, the guiding optics further comprising a plurality of temporal filters configured for selectively preventing electromagnetic radiation from one, or more of the FOVs from reaching the sensor at different times. The control unit is configured for determining the FOV corresponding to the identified condition, by separately analyzing subsets of the image data corresponding to the collected EM radiation from each FOV, and identifying the condition in the subset of data corresponding to the FOV.

According to an aspect of some embodiments of the present invention, there is provided a method for imaging scenes in a plurality of FOVs, comprising: receiving EM radiation portions from a plurality of FOVs; and directing at least part of the EM radiation portions to a single sensor.

In a variant, the directing comprises directing the EM radiation from each FOV to a respective section of the sensor.

In another variant, the directing comprises directing the EM radiation from each FOV to a same section of the sensor. Optionally, the EM radiation from at least some FOVs is directed to simultaneously illuminate the sensor. Optionally, the EM radiation from none, one, some, or all FOVs are directed to illuminate the sensor at different times.

According to an aspect of some embodiments of the present invention, there is provided a method for locating an event, the method comprising: receiving EM radiation portions from a plurality of FOVs, wherein the event occurs in at least one of the FOVs; directing the EM radiation from each FOV to a respective section of a sensor; processing and analyzing image data generated by the sensor and producing image data indicative of a certain condition corresponding to the event in one or more of the FOVs; and locating one or more sections of the sensor which generated the image data indicative of the condition.

According to an aspect of some embodiments of the present invention, there is provided a method for locating an event, the method comprising: receiving EM radiation portions from a plurality of FOVs, wherein the event occurs in at least one of the FOVs; filtering EM radiation from each FOV in a unique manner; directing the EM radiation from each FOV to a same section of a sensor; processing and analyzing image data generated from the sensor and producing image data indicative of a certain condition corresponding to the event in one or more of the FOVs; and identifying the unique filtering of the electromagnetic radiation in the image data sporting the condition, thereby enabling an identification of the FOV in which the event occurred.

Optionally, the filtering comprises selectively guiding EM radiation from each, some, and/or all FOV to reaching the sensor at different times, and the identifying comprises identifying a time point in which the EM radiation that generated the image data sporting the condition was received by the sensor.

In a variant, the identifying of a time point comprises: generating a first piece of image data indicative of EM radiation from all FOVs illuminating the sensor simultaneously; generating a sequence of second image data pieces, each piece being indicative of EM radiation from a respective FOV illuminating the sensor; comparing the first piece of image data with the image data pieces of the sequence, to identify the piece of second image data corresponding sporting the condition.

In another variant, the filtering comprises applying a unique optical filtering to EM radiation from each FOV; the guiding comprises guiding EM radiation from all FOVs to reach the sensor simultaneously; the identifying comprises identifying the unique optical filtering corresponding to the EM radiation that generated the image data sporting the condition.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 17 illustrates the operation of a multidirectional imaging system of the present invention, where temporally differentiating image processing is applied to detect movement, according to some embodiments of the present invention;

FIG. 18 illustrates the operation of a multidirectional imaging system of the present invention, where spatially differentiating and temporally differentiating image processing techniques are applied to detect movement, according to some embodiments of the present invention;

FIG. 35a is a drawing illustrating a monitoring system for monitoring a fence/barrier, as known in the art;

FIGS. 35b-35c are schematic drawings exemplifying a monitoring system for monitoring a fence/barriers, using a multidirectional imaging device of the present invention;

DETAILED DESCRIPTION OF EMBODIMENTS

Figure 1A:
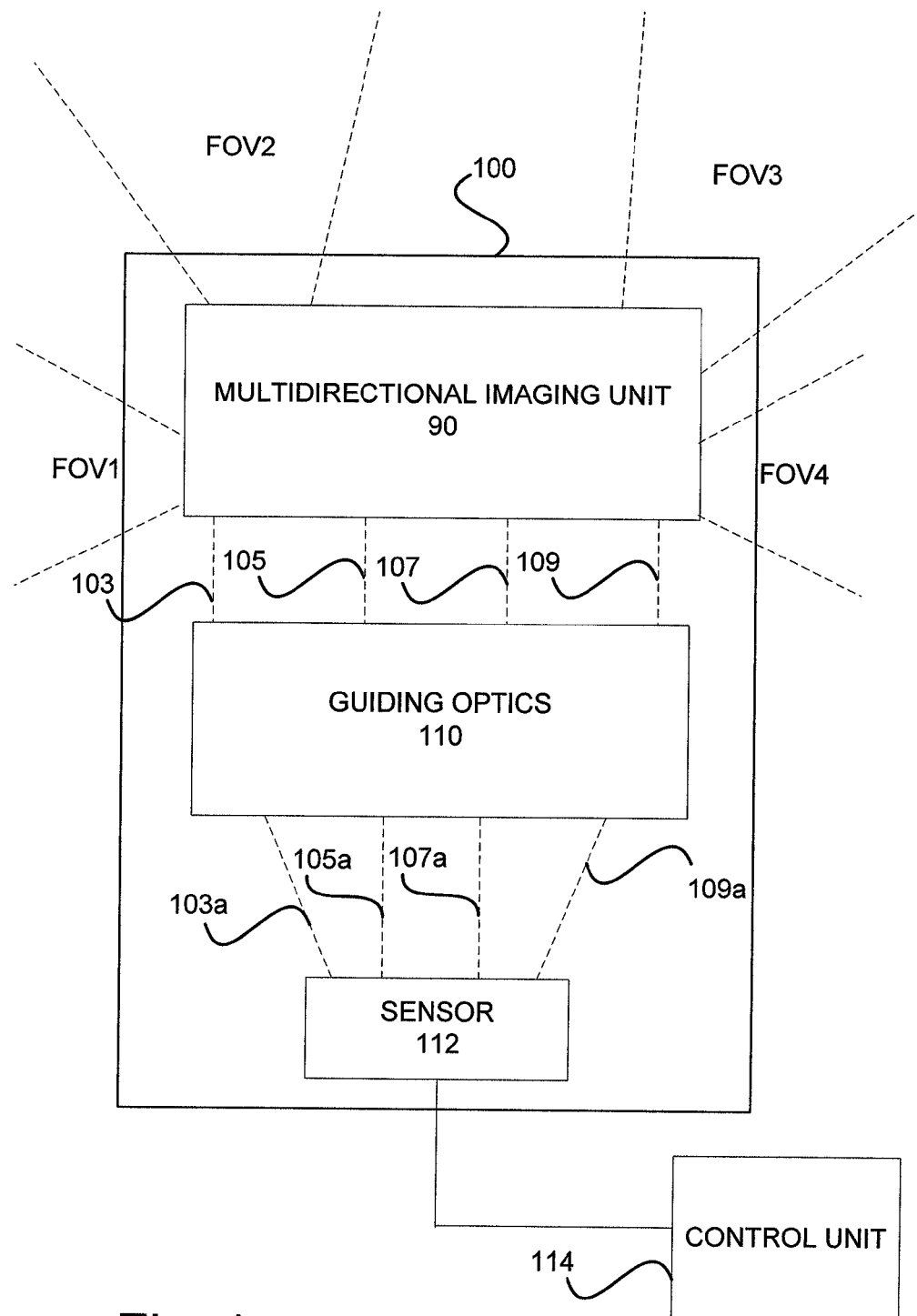
FIGS. 1a-1c are block diagrams illustrating a multidirectional imaging device of the present invention.
Figure 1B:
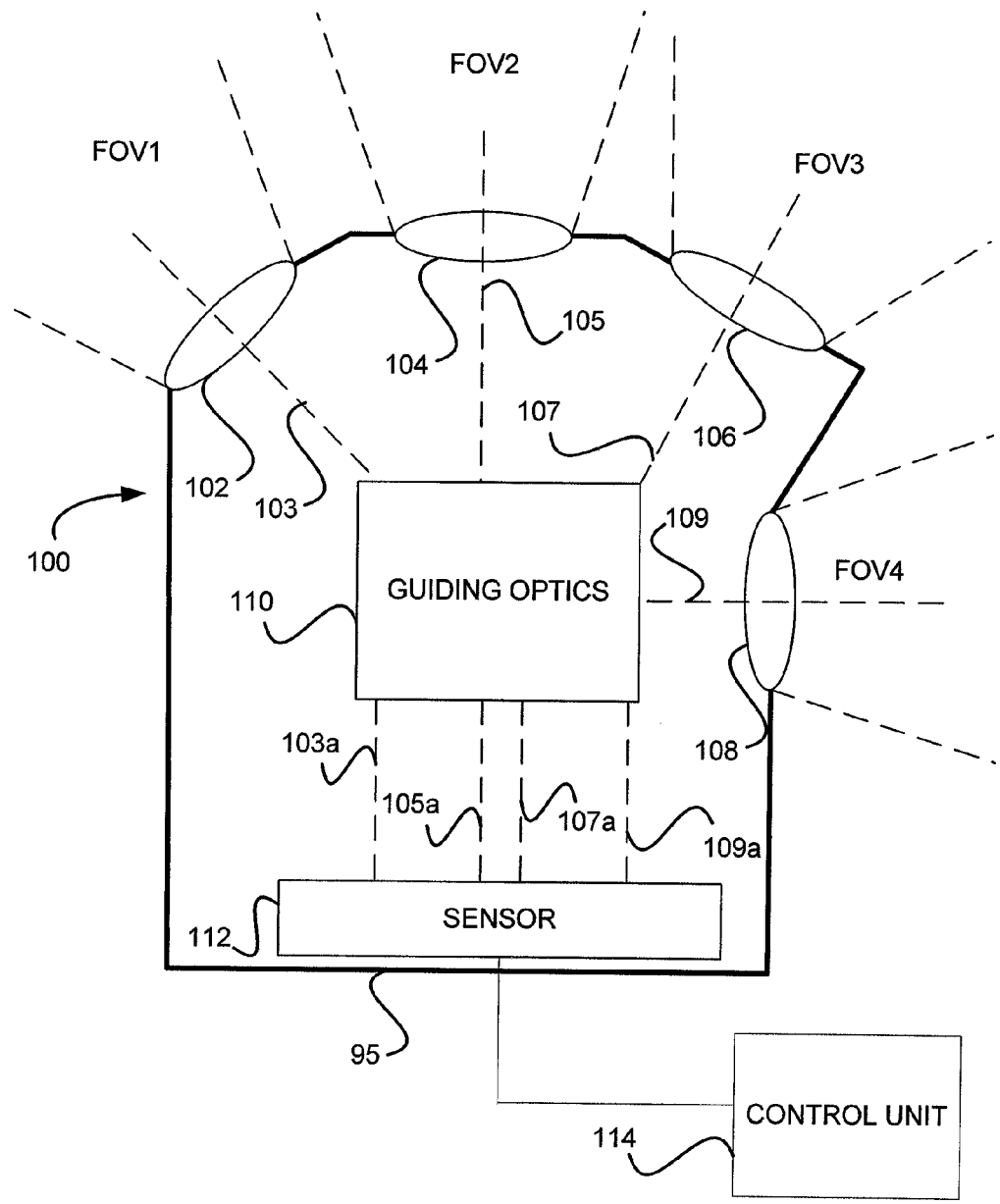
Figure 1C:
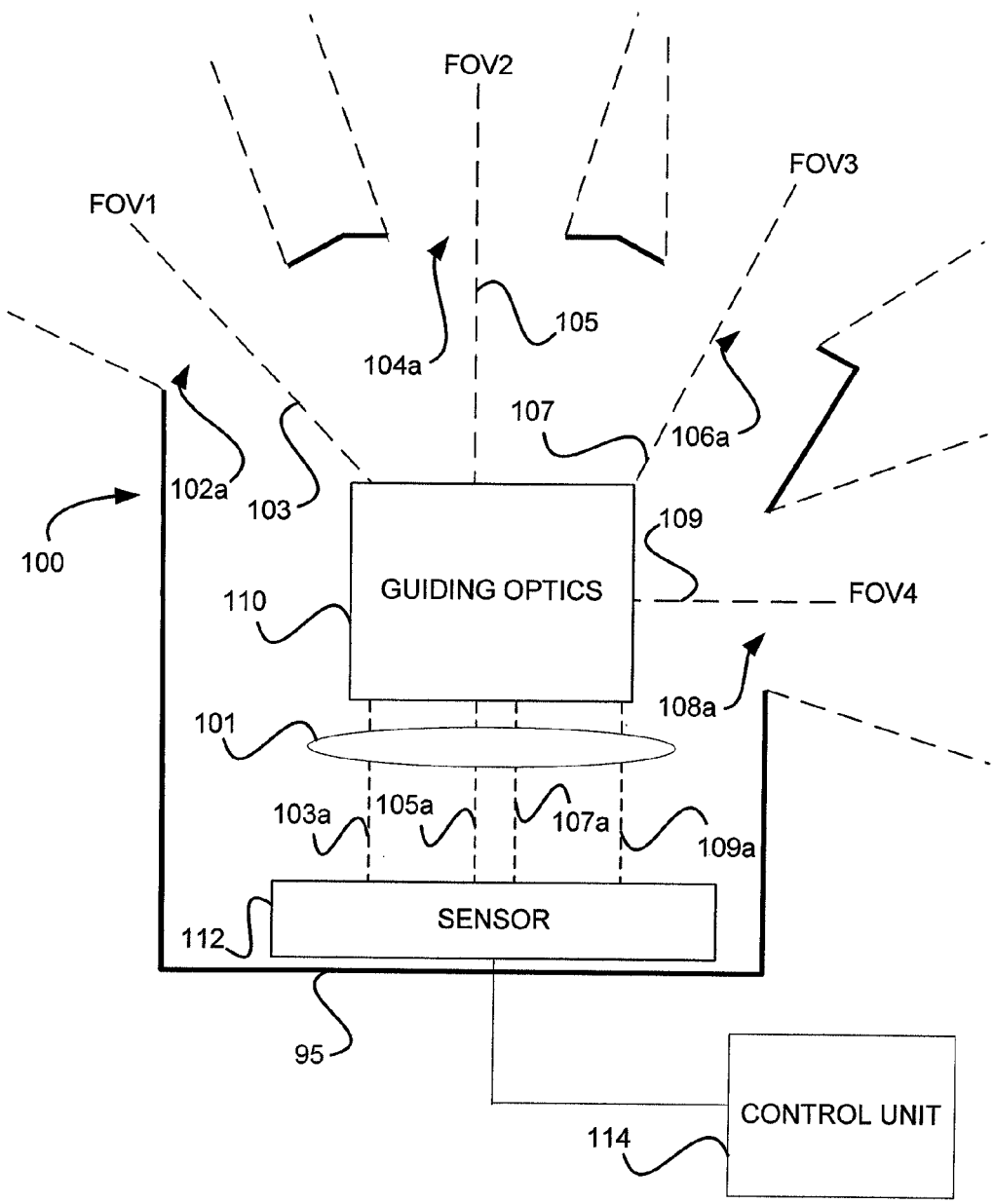

Referring now to the figures, FIGS. 1a-1c are block diagrams illustrating a multidirectional imaging device 100 of the present invention.

The device 100 shown in FIG. 1a includes a multidirectional imaging unit 90, guiding optics 110, and a EM sensor/detector 112. The multidirectional imaging unit 90 defines a plurality of different fields of view (FOVs), and is configured for receiving EM radiation from the plurality of FOVs. The guiding optics 110 receives the EM radiation portions collected simultaneously or almost simultaneously by the imaging unit 90 from two or more FOVs, and direct the received radiation to the sensor 112. The sensor 112 generates image data in response to input EM radiation. It should be understood that radiation from the different FOVs reaches the sensor 112, either simultaneously or at different times, and the image data is then appropriately processed. This obviates the need for a sensor for each FOV as well as obviates the need for scanning multiple fields of view by the same sensor. Furthermore, as will be seen below (FIGS. 12-16), the device 100 may include a plurality of sensors, each sensor receiving some EM radiation from all the FOVs, either simultaneously or at different times. This enables, inter alia, the creation of high-resolution images with a decreased need for processing power or high-quality (and therefore expensive) sensors.

The multidirectional imaging unit 90 includes one or more radiation collecting optical elements (e.g., lenses) having a desired FOV. The multidirectional imaging unit 90 may be configured such that the lenses are mounted in a spaced-apart fashion on the outer surface of the housing of the device being installed in corresponding spaced-apart apertures made in the housing as seen in FIG. 1b. Alternatively, or additionally, the radiation collecting optical element(s) may be constituted by apertures/optical windows made in the outer surface of the housing. Input light portions collected by the apertures propagate to and are received by the guiding optics which appropriately redirects the light towards the sensor—see FIG. 1c. In this case, an imaging lens arrangement is provided in the optical path of light propagating from the guiding unit to the sensor. It should be understood that optical window may or may not be a perforation itself but may be an aperture covered by an optically transparent film/panel (i.e. at least partially transparent to the radiation detectable by the sensor 112). The optical and geometric characteristics of the optical element(s) as well as the characteristics of the elements in the guiding optics define the shapes and sizes of the FOVs.

The guiding optics 110 includes optical elements for directing the received EM radiation to the sensor 112. Such optical elements may include one or more lenses, deflectors (e.g. mirrors), beam splitters, etc. In a variant, the guiding optics 110 directs radiation from each FOV to strike a respective section of the sensor 112. In another variant radiation from all the FOVs or at least some of them is directed to strike the same section of the sensor 112. The guiding optics 110 may also include one or more filters (spatial and/or temporal filters and/or spectral filters and/or diffractive gratings), associated with different FOVs. These filters may be configured for filtering EM radiation from each FOV in a unique manner (i.e. apply certain coding to the light portion associated with certain FOV), before the EM radiation illuminates the sensor 112. In this manner, image data generated by the sensor in response to illumination from each FOV can be differentiated by proper image processing.

The sensor unit 112 typically has a two dimensional EM sensitive surface, and can be of any known in the art suitable configuration for detection of EM radiation. The choice of sensor may depend, for example, on the wavelength of the EM radiation that is to be detected, or on the expected intensity of the EM radiation that is to be detected. For example, for detecting visible light or near infra-red (NIR) radiation, a Complementary Metal-Oxide Semiconductor (CMOS) sensor or Charged Coupled Device (CCD) may be used. For Middle Wave Infra Red (MWIR) imaging a cooled InSb sensor may be used, while for Long Wave Infra Red (LWIR) imaging an uncooled bolometric sensor may be used.

The device 100 may be associated with a control unit 114, which receives that image data from the sensor 112 and applies image processing algorithms to identify a certain condition in the image data. The condition may correspond to a certain event (motion, fire, a certain shape) within any of the scenes within the FOVs. The control unit 114 is typically a computer system including software and/or hardware utilities (such as a processor, memory, modules, etc.). In a variant, the control unit performs further image processing to identify the FOV in which the event occurred. Optionally upon identification of the condition, the control unit generates a control signal to warn a user, or to initiate automatic performance of an action related to the event. The control unit 114 may be integral with the device 100, or may be a separate unit connectable to the device.

In the example of FIG. 1b, the imaging unit 90 includes an opaque housing 85 carrying a plurality of objective lens arrangements, four such lenses 102, 104, 106, 108 being shown in the present not limiting example, which collect light with different FOVs—FOV1, FOV2, FOV3, FOV4. Collected light portions 103, 105, 107, 109 from respective FOVs are received by the guiding unit 110, which redirects them into corresponding light portions 103a, 105a, 107a, 109a that reach the sensor 112.

In the example of FIG. 1c, light collecting elements in the form of apertures 102a, 104a, 106a, 108a made in the opaque housing 85 of the imaging unit 90 are used, and a single objective lens arrangement 101 is provided downstream of the guiding unit, with respect to general light propagation direction through the device. The apertures 102a, 104a, 106a, 108a collect EM radiation portions 103, 105, 107, 109 from respectively FOV1, FOV2, FOV3, FOV4. The guiding optics directs corresponding light portions 103a, 105a, 107a, 109a to the lens 101, which focuses them on the light sensitive surface of the sensor 112. It should be noted the single lens arrangement 101 may be replaced by a plurality of objective lenses each associated with radiation collected from a respective FOV.

As indicated above, the device may be configured and operable such that different light portions associated with different FOVs are projected onto different sections/segments of the light sensitive surface of the sensor unit, and/or two or more different light portions are projected onto the same section of the light sensitive surface.

Referring now to FIGS. 2-5, some embodiments of the present invention are illustrated, in which EM radiation from each FOV is directed to a respective section of the sensor. The guiding optics includes a plurality of deflectors (mirrors), each mirror being oriented to deflect (reflect) radiation from a respective FOV to a respective section of the sensor 112.

Figure 2:
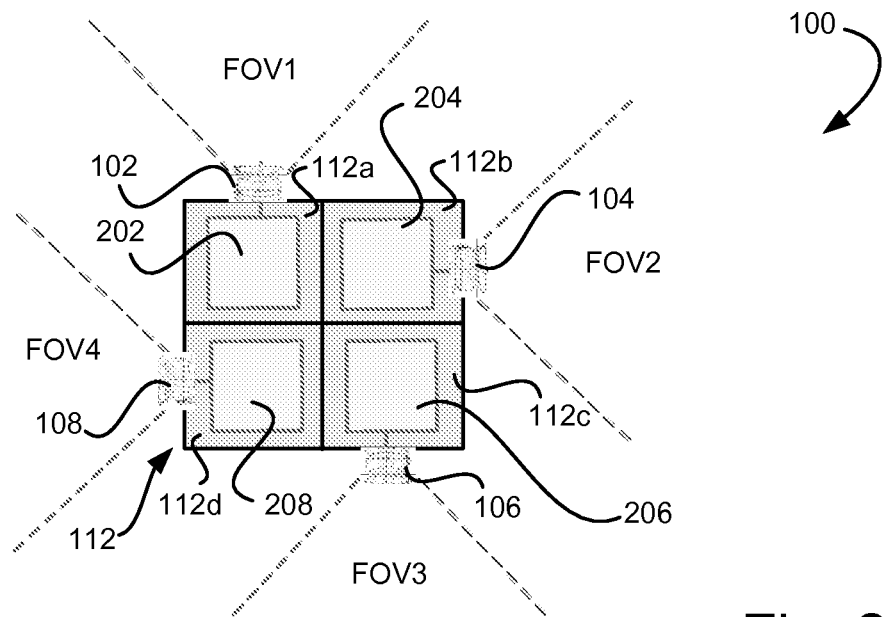
FIGS. 2-5 are drawings illustrating some embodiments of the present invention, in which EM radiation from each FOV is directed to a respective section of the sensor.
Figure 3:
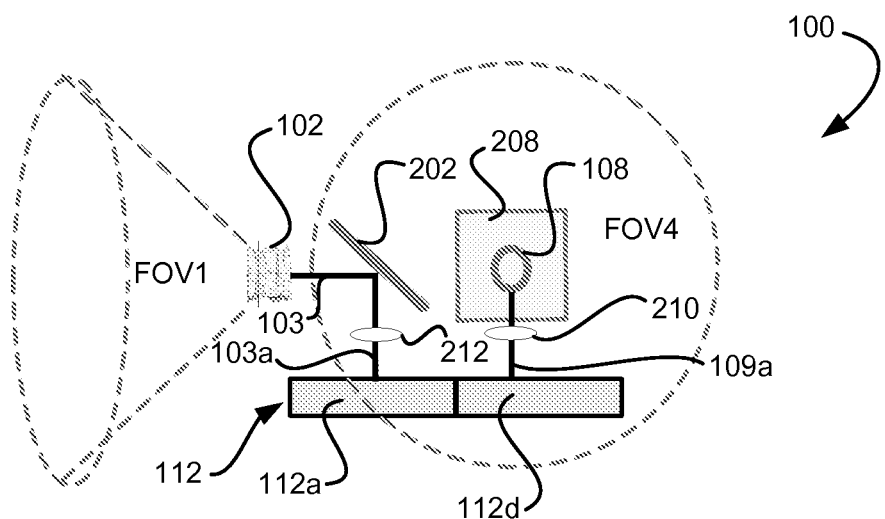

FIG. 2 depicts a schematic top view of an embodiment of the present invention, in which EM radiation portions from four FOVs are concurrently projected onto the sensor 112, such that radiation from each FOV illuminates a respective section of the sensor 112. FIG. 3 depicts a side view of the embodiment of FIG. 2, where for simplicity only two EM rays are presented.

In FIGS. 2 and 3, the device 100 of the present invention includes four light collecting elements (objective lens arrangements in the present example) 102, 104, 106, 108, for collecting EM radiation portions 103, 105, 107, 109 respectively from FOV1, FOV2, FOV3, FOV4. The collected light portions 103, 105, 107, 109 are reflected by respective mirrors 202, 204, 206, 210 toward the respective sections 112a, 112b, 112c, 112d of the sensor 112. It should be noted that due to imperfections in the mirrors (e.g. imperfect surface, or imperfect reflectance), the mirrors may not be able to reflect the entire collected EM rays onto their respective sensor portions. For example, the mirror 202 reflects part (for example, most) of the light portion 103 toward the sensor section 112a, while some of the light portion 103 is dispersed. Therefore, light portion that actually reaches the sensor section 112a is designated 103a, and is at least part of light portion 103. Similarly, parts 103a, 105a, 107a, 109a of the EM radiation 103, 105, 107, 109 reach the sensor 112.

Optionally, the guiding optics of the device 100 includes a plurality of refractive elements (e.g. lenslets), each positioned between a corresponding mirror and the imaging sensor. Each refractive element (210, 212) collects the EM radiation reflected by the respective mirrors (208, 202), and focuses the EM radiation on the respective section (112d, 112a) of the sensor 112.

Figure 4:
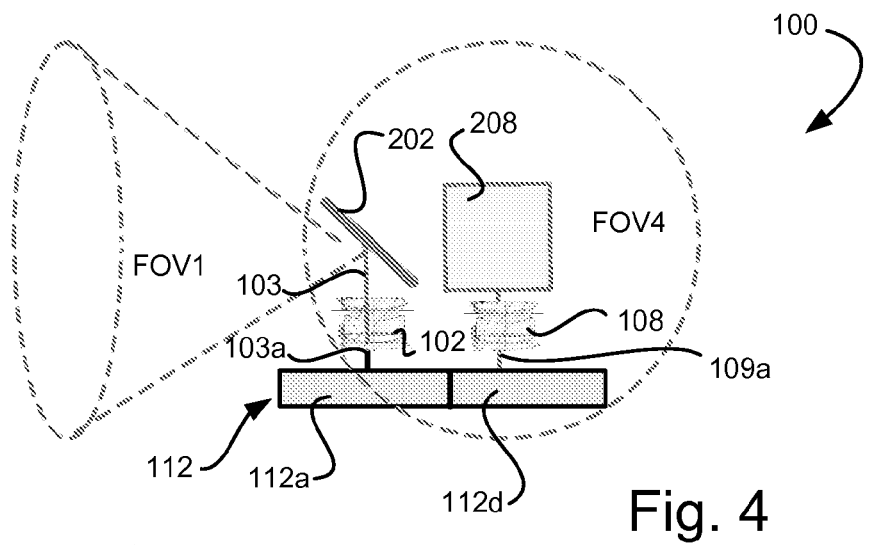

The device 100 of FIG. 4 is configured generally similar to the device of FIGS. 2 and 3, but the lens arrangements are located between the respective mirrors and the sensor 112. The imaging unit, therefore includes a plurality of apertures (not shown) and a plurality of respective objective lens arrangements (102, 108), as explained above with reference to FIG. 1c. Each light ray (103, 109) is collected via a respective aperture (not shown), reflected by a respective mirror (202, 208), and focused by a respective objective (102, 108) onto a respective section (112a, 112d) of the sensor 112.

Figure 5:
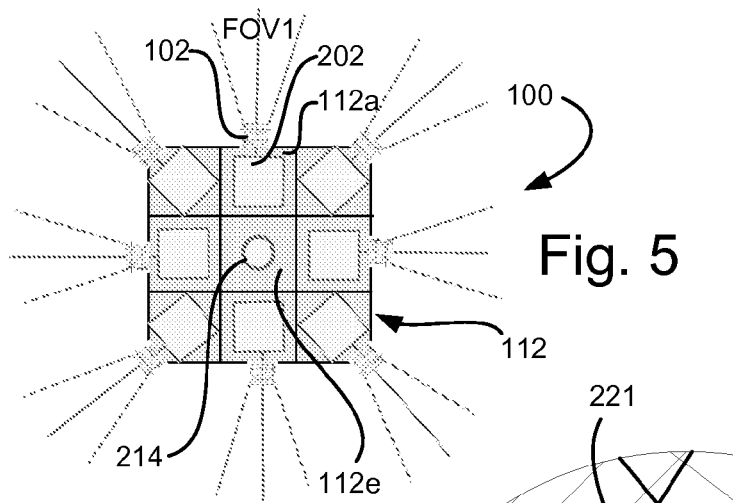

Referring now to FIG. 5, a top view of an embodiment of the current invention is shown, in which EM radiation rays from nine FOVs are projected onto nine respective parts of a two dimensional imaging sensor.

The device 100 includes eight objective lens arrangements (such as the objective lens arrangement 102) located along a perimeter of the device 100, to cover a panoramic field of regard. A portion of the EM radiation collected by each objective lens arrangement is directed by a respective mirror (e.g. 202) toward a respective portion (e.g. 112a) of the sensor 112. A ninth objective lens arrangement 214 collects EM radiation from an FOV above the device 100, and directs such EM radiation onto a corresponding section 112e of the sensor 112. It should be noted that the collection of light along the perimeter of the device 100 may be performed via a plurality of apertures and objective lenses located between the mirrors and the sensor, as explained above, in FIG. 4.

Figure 6:
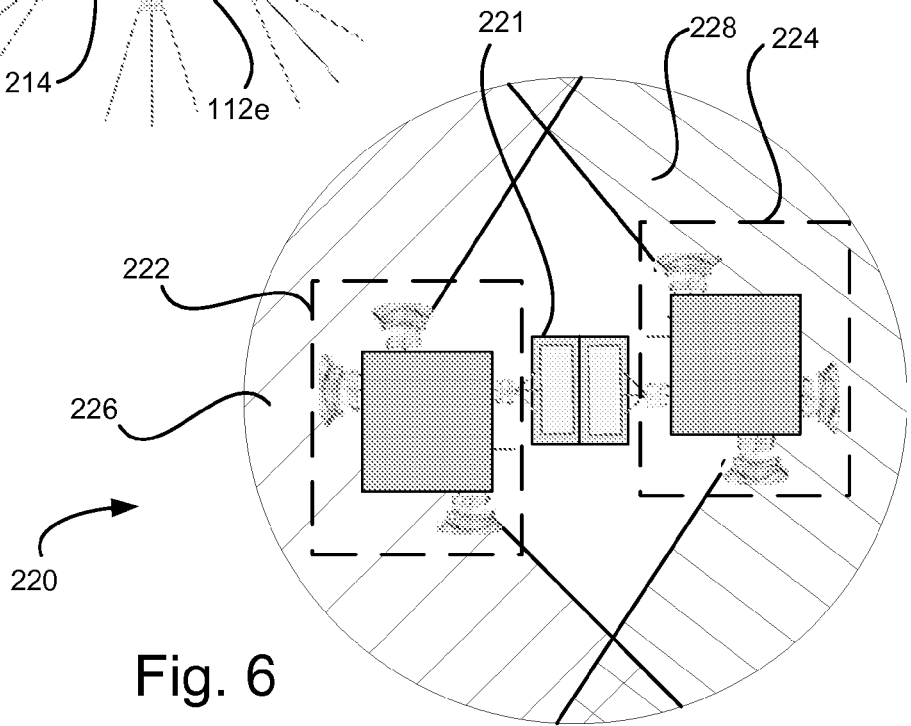
FIG. 6 is a schematic drawing illustrating an apparatus of the present invention, including two back-to-back devices projecting multidirectional EM radiation on two different (opposite) parts of a double-sided sensor.

Referring now to FIG. 6, a schematic drawing illustrates an apparatus 220 of the present invention including two back-to-back devices projecting multidirectional EM radiation on two different (opposite) parts of a double-sided sensor.

The apparatus 220 includes two multidirectional imaging devices 222 and 224. The devices 222 and 224 include a multidirectional imaging unit and guiding optics, as described above. Each device collects EM radiation from three FOVs and projects it onto a respective side of a two dimensional sensor 221. Therefore, an effective FOV 226 is projected onto the sensor 221 by the device 222, while an effective FOV 228 is projected onto the sensor 221 by the device 224. Therefore, the apparatus 220 provides a panoramic FOV.

Optionally, each device (222 and 224) is located on separate or combined optical benches, in order to provide maximum flexibility and stability in generating optimized optical coverage configurations and utilization of the imaging sensor. For example, each optical bench may be using different FOVs or filters, in an application where one bench is observing a ground based scene and the second bench is observing a sky scene.

FIGS. 7 to 16 illustrate examples of the present invention, in which EM radiation from a plurality of FOVs is projected onto a single section of a sensor, either simultaneously, or at different times.

Figure 7:
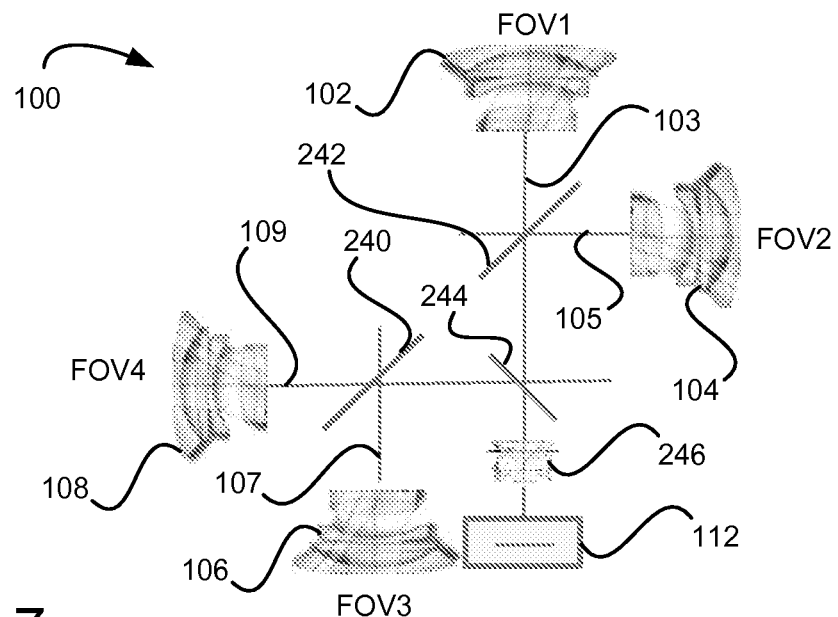
FIG. 7 is a drawing illustrating a device of the present invention, in which EM radiation from a plurality of FOVs is directed to the same section of the sensor.

Referring now to FIG. 7, a schematic drawing illustrates a device 100 of the present invention, in which EM radiation from a plurality of FOVs is directed to the same section of the sensor.

In the device 100 of FIG. 7, the guiding optics includes three beam splitters 240, 242, and 244 set up so as to direct at least a portion of each collected portion/ray of EM radiation to the surface of the sensor 112. Part of the ray 103 collected with FOV1 is transmitted through the first beam splitter 242, and the remaining part is transmitted through the second beam splitter 244 to the sensor 112. Part of the ray 105 coming from FOV2 is reflected by the first beam splitter 242 and the remaining part of said ray is transmitted through the second beam splitter 244 to the sensor 112. Part of the ray 107 from FOV3 is reflected by the third beam splitter 240, and the remaining part of said ray is reflected by the second beams splitter 244 to the sensor 112. Part of the fourth ray 109 is transmitted through the third beam splitter 240, and the remaining ray is reflected by the second beams splitter 244 to the sensor 112. Therefore the entire light sensitive surface of the sensor 112 is illuminated by radiation from each FOV.

In a variant, the EM radiation is collected by objective lens arrangements 102, 104, 106, 108. Optionally, the guiding optics includes a refractive unit 246 located between the second beams splitter 244, and configured to focus onto the sensor 212 the EM radiation that has been directed by the beams splitters. In another variant, the EM radiation is collected by apertures on the device's housing and a single objective lens is used (not shown), as explained above.

Figure 8:
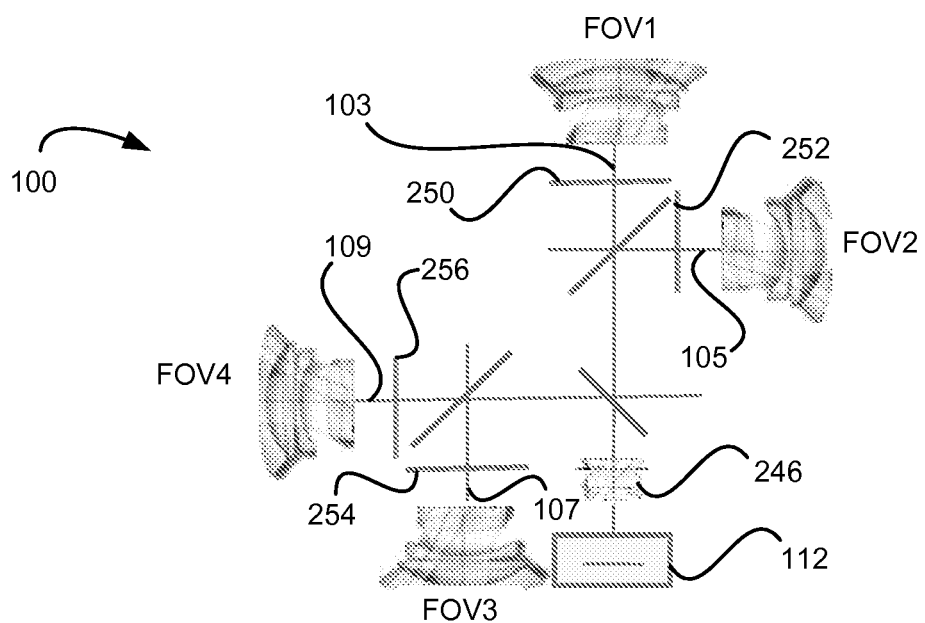
FIG. 8 illustrates the device of FIG. 7 further including optical filters associated with the different FOVs.

Referring now to FIG. 8, the device 100 of FIG. 7 further includes optical filters associated with the different FOVs. The optical filters 250, 252, 254, 256 are associated with FOV1, FOV2, FOV3, FOV4, respectively. Each optical filter is configured for filtering EM radiation from its corresponding FOV in a unique manner. This eliminates confusion that may be created by projection of EM radiation from different FOVs onto the same sensor 112, and enables the association of image data corresponding to certain radiation with the specific FOV from which the certain radiation was collected. For example, if a certain condition has been detected in image data, the specific image data sporting that condition can be identified. An analysis of the specific image data can be sued to extract the unique filtering of the specific radiation corresponding to the specific image data. By knowing a priori the unique filtering to which radiation from the different FOVs are subjected to, the specific image data can be associated with the respective FOV.

The condition may correspond to a certain event. For example, the firing of a rifle (the event) produces a certain spectral signature (the condition) in the image data. By identifying the FOV corresponding to the spectral signature, the location from which the rifle was fired can be determined.

In a variant, the optical filters (also called optical coders) include spectral bandpass filters, each transmitting radiation of a unique spectral band, one for each FOV. By identifying the spectral band in the radiation corresponding to the image data sporting the condition, the FOV in which the corresponding event has occurred is identified. In this case, in the sensor, adjoining pixels are also encoded spectrally respectively, such that for a given resolution element several spectral pixels are used to determine from which FOV the scene change occurred. For example, a CMOS color sensor may be incorporated in the sensor 112. In this manner each pixel can detect a respective color component (e.g. Red, Green, Blue), and in addition an additional sensor may be used to detect the NIR band. If each FOV is spectrally filtered in a unique and different manner, and for a known spectral signature of the event, the FOV in which the event occurred can be determined.

In another variant, the optical filters include diffraction gratings, oriented in different angles (one for each FOV). In this manner, the detected condition in the image data is analyzed to determine how the spectral components of the image data sporting the condition are oriented, thereby determining in which FOV the event associated with the corresponding condition has occurred.

The optical filters described above may be implemented as separate optical elements, or can also be designed as coatings on the beam splitters or on the objective lens arrangements.

Figure 9:
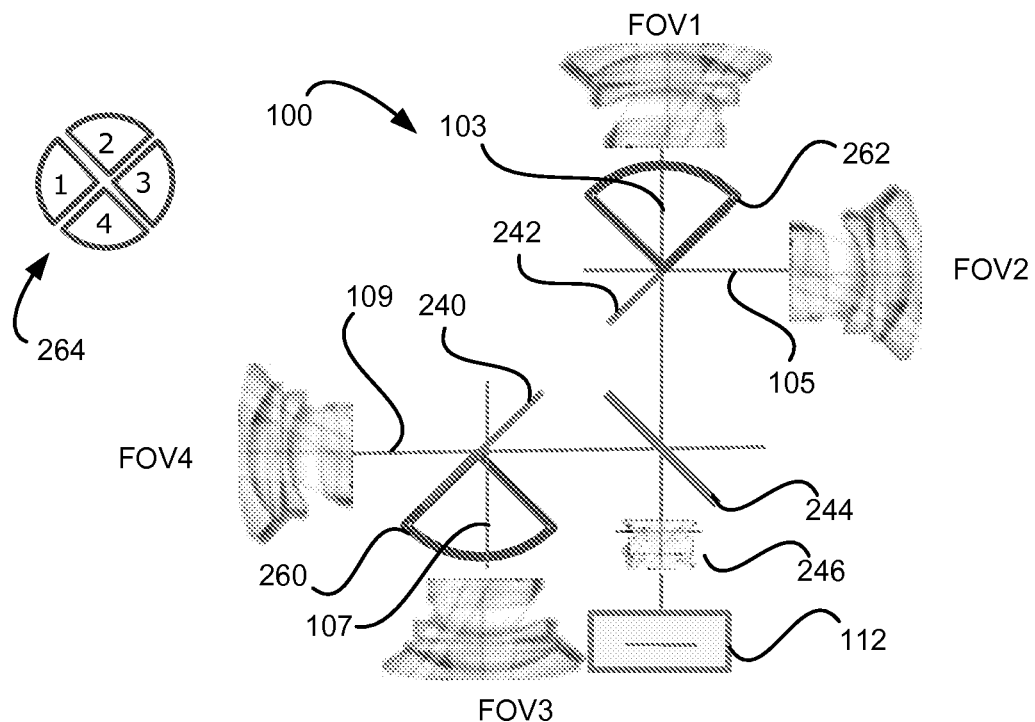
FIG. 9 illustrates the device of FIG. 7 further including time filters associated with the different FOVs.

FIG. 9 illustrates the device 100 of FIG. 7 further including temporal filters associated with the different FOVs.

In this example, the temporal filters include two opto-mechanical switches 260 and 262 incorporated at each of the two frontal beam splitters 240 and 242, respectively. The temporal filters are configured to be controllably moved (e.g. rotated) to predetermined positions, in order to selectively prevent EM radiation from one, some, or all of the FOVs to reach the sensor at predetermined times. In this manner, all possible combinations of radiation collected from different FOVs can be projected onto the sensor, for detection and surveillance purposes.

The temporal filters, therefore, provide the device 100 the ability to switch between the FOVs. The rate at which the device 100 switches between the FOVs (step-stare rate) is important, since some events (e.g., firing flash of a rifle, illumination flash, laser pulse, motion in space of the device 100) are very short lived. Therefore, it is desirable to have a high step-stare rate, in order to have the ability to detect short-lived events. For this purpose, rotational shutters of low weight (e.g. several grams) may be used as temporal filters, since these shutters require low rotational force for activation and positioning accuracy. This enables rapid switching between the FOVs up to and beyond video rates, thereby enabling the achievement of a high-rate step-stare scanning function without having to move any optical elements. Such step-stare scanning is often desirable in wide coverage surveillance applications, where adjacent FOVs are stitched digitally in generating panoramic imagery.

At 264, a top view of four discrete positions (1, 2, 3, 4) of each of the temporal filters is shown. The temporal filters may be actuated independently from each other. The following table describes several of the potential variety of FOV projection combinations as a function of respective shutter positions:

| Index | Shutter 260 position | Shutter 262 position | FOVs projected |
|---|---|---|---|
| 1 | 1 | 4 | 2 |
| 2 | 2 | 4 | 1 + 2 |
| 3 | 3 | 4 | None |
| 4 | 4 | 4 | 1 |
| 5 | 3 | 1 | 3 + 4 |
| 6 | 3 | 2 | 4 |
| 7 | 3 | 3 | 3 |
| 8 | 2 | 1 | 1 + 2 + 3 + 4 |
| 9 | 2 | 2 | 1 + 2 + 4 |
| 10 | 2 | 3 | 1 + 2 + 3 |
| 11 | 3 | 4 | None |
| 12 | ... | ... | ... |

It should be noted that the use of optical filters and temporal filters can be combined within a single device 100. This provides additional modes of operation of the device 100. For example the optical filters may be used when detecting small targets, and then the temporal filters may be operated to block all FOVs except for the one in which the target is located, for investigating a detected object.

Figure 10:
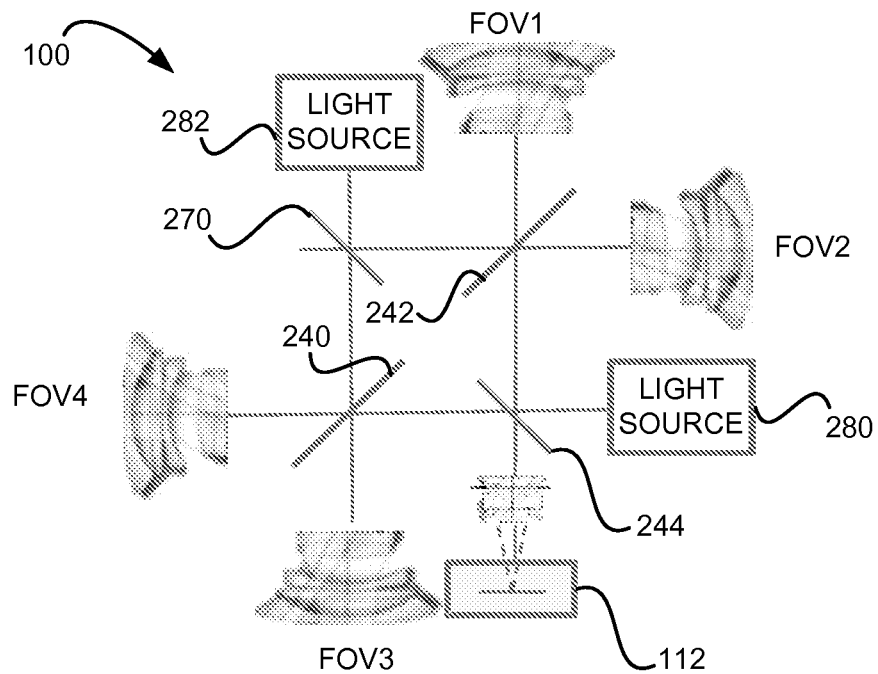
FIG. 10 illustrates a device of the present invention, including one or more light sources for illuminating the scenes within the FOVs.

Referring now to FIG. 10 a device of the present invention is exemplified, the device 100 including one or more light sources for illuminating the scenes within the FOVs.

The device of FIG. 10 is configured generally similar to the device of FIG. 7, but includes a light source 280, configured for illuminating the scenes within the FOVs. The light beam originating from the light source 280 is split by the beam splitters and directed outward by beam splitters to illuminate the scenes. This light is subsequently projected back from the scene to the device 100. In this manner, the images are subsequently projected onto the sensor 112, thereby enabling better imaging sensitivity in low light scenes. Optionally, the device 100 includes the temporal filters described above. In this case, the temporal filters can also be used to selectively switch the illumination of the different FOVs.

In a variant, the device 100 includes a second light source 282. With the three-beam-splitter setup, light originating from the second light source 282 would only illuminate the scenes of FOV3 and FOV4. Therefore, fourth beam splitter 270 is added to direct some of the light produced by the second light source 282 out of the device 100 and onto FOV1 and FOV2 as well. Exemplary light sources may include light emitting diodes (LEDs), lasers, and flash lamps.

According to some embodiments of the present invention, two devices according to FIGS. 7-10 can be stacked, one on top of the other, where the FOVs of the first device are turned 45 degrees with respect to the FOVs of the second device. In this manner, each FOV can be reduced to 45 degrees, rather than 90 degrees, while the stacked device provides a continuous panoramic coverage. Reduction of the FOV angle leads to higher-resolution imaging, which may be needed for surveillance purposes, or for detecting small scene changes.

It should also be noted that the FOVs in FIGS. 7-10 are shown to be at the same height and having the same vertical orientation. Generally, this is not required. In fact, the present invention extends to the case in which the FOVs are at different heights, and the radiation from the FOVs is directed to a single sensor, for example via vertical mirrors and/or beam splitters.

The examples of FIGS. 7-10 describe a setup in which the four FOVs, each being about 90 degrees, are defined and imaged by the device 100. It should be noted that this number of FOVs was chosen as an example alone. The device of the present invention is not limited to the imaging of four FOVs. Any number of FOVs above two can be chosen, according to the user's need, and the guiding optics can be easily modified accordingly.

Figure 11:
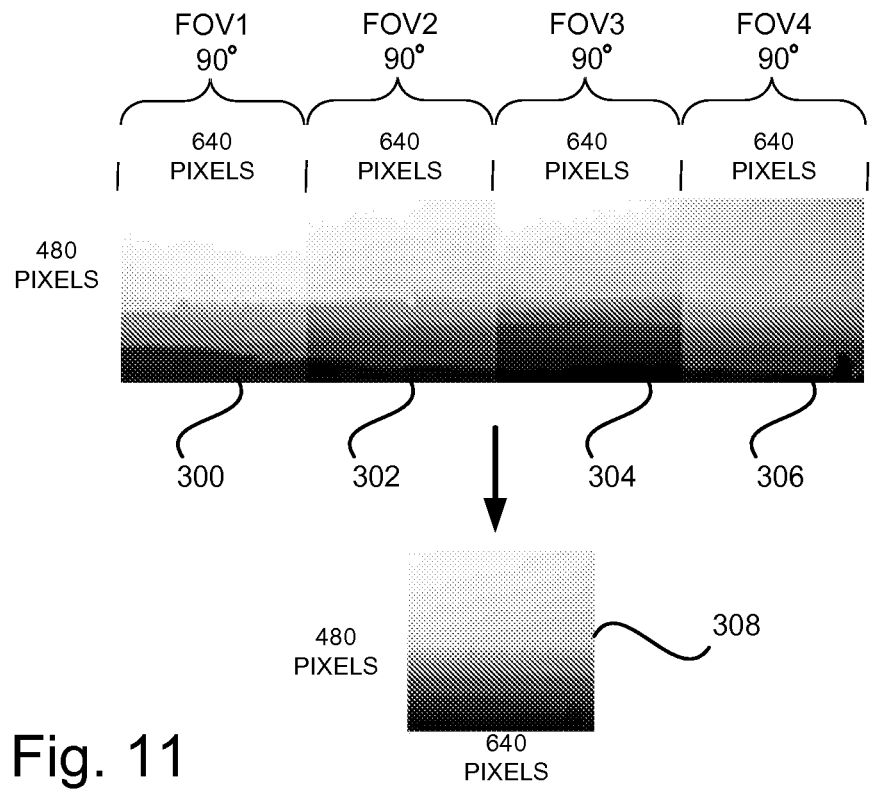
FIG. 11 illustrates an image projected on a sensor, wherein the image is a combination of images projected on the sensor from different FOVs.

Referring now to FIG. 11, there is illustrated an image projected on a sensor, wherein the image is a combination of image parts projected on the sensor from four different FOVs.

By choosing FOVs of 90 degrees each, the devices on FIGS. 7-11 can provide continuous panoramic imaging. The four images 300, 302, 304, 306 are projected onto the sensor from FOV1, FOV2, FOV3, and FOV4 respectively. The combined image is image 308.

Using an infrared (IR) uncooled sensor 640×480 with 25 micron pitch, or a near infrared (NIR) sensor 640×480 with 10 micron pitch, onto which four FOVs are simultaneously projected, the instantaneous field of view (IFOV) is 2.45 mrad (keeping in mind 2πi radians in a circle, that is 6.28 radians, that is 6280 milliradians). For a four-FOV setup, the IFOV is calculated according to the following formula:

$$IFOV = 2\pi 1000/(N \times L)$$

where N is the number of FOVs and L is the length of the sensor. In the present example, FOV is 6280 mrad/4, while L is 640.

In contrast, a camera having a single lens (e.g. fisheye) with a 640×480 pixel detector, covering a horizontal panoramic field of regard (FOR), would result in an instantaneous field of view (IFOV) of approximately 4.16 mrad. For a fisheye setup, $$IFOV = 2\pi 1000/(2\pi r)$$

where r is the radius in pixels of the largest circle made by the sensor rotating about its center.

The IFOV of the single-lens (fisheye) camera may be too large to detect spatially small and brief image changes at large distances, thereby resulting in a decreased detection sensitivity. By using the projecting of four FOVs onto one sensor simultaneously or near simultaneously, the technique of the present invention can provide a reduced IFOV, thereby enabling improved detection sensitivity. Moreover, a fisheye lens typically covers 180 degrees (i.e. hemispherical image), while the technique presented in this invention provides a panoramic strip image. For example, if each of 4 FOVs has 90 degrees, then horizontally this covers 360 degrees, while vertically covering +45 degrees to −45 degrees about the horizontal, and this field of regard is more effective for typical surveillance and detection systems. Therefore, the technique of the present invention, as described above may be used in the design of a low-cost, single-imaging sensor, panoramic change-detection system.

Figure 12:
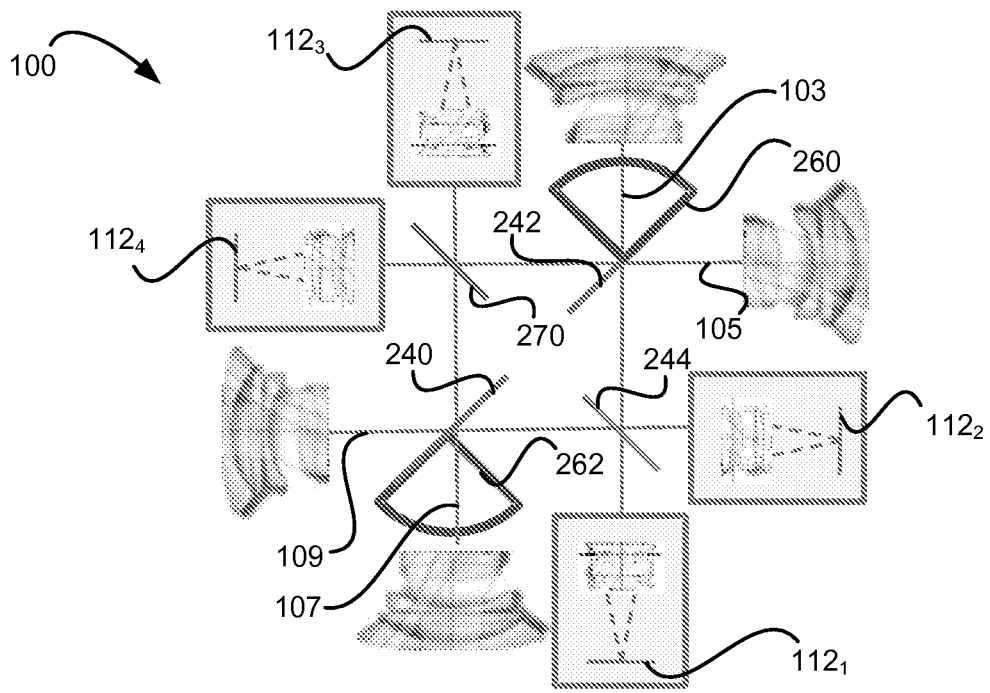
FIG. 12 illustrates a device of the present invention, comprising a plurality of sensors, each sensor being configured for receiving EM radiation from a plurality of FOVs.

Referring now to FIG. 12, a device of the present invention, comprising a plurality of sensors is exemplified. The guiding optics is configured for projecting onto the sensor EM radiation from a plurality of FOVs.

The device 100 of FIG. 12 is generally similar to that of FIGS. 7-10, but includes a plurality of sensors—four separate sensors 1121, 1122, 1123 and 1124. EM radiation from a plurality of FOVs is directed onto each of the sensors. For example, a portion of the radiation ray 103 reaches the sensor 1121 by transmission through the beams splitters 242 and 244. Another portion of the radiation ray 103 reaches the sensor 1122 by transmission through the beam splitter 242 and reflection from the beam splitter 244. A further portion of the radiation ray 103 reaches the sensor 1123 by reflection from the beam splitters 242 and 270. Yet another portion of the radiation ray 103 reaches the sensor 1124 by reflection from the beam splitter 242 and transmission through the beam splitter 270. In a similar manner, each of the sensors 1121, 1122, 1123, and 1124 receives portions of radiation rays 105, 107, and 109 as well.

This configuration provides many advantages. For example, each sensor may be equipped with a bandpass filter, enabling simultaneous multispectral detection of a multidirectional field of regard. Moreover, this configuration may provide redundancy of sensors, which can lead to improved imaging by integrating multiple sensor images for reducing random noise. Furthermore, the sensors may also be positioned contiguously to each other (as will be shown in FIGS. 13 and 15), in order to enlarge the imaged FOV of the sensor through each of the optical lenses. For example, if the optical configuration can support a larger projected image area than the available detector arrays, such contiguous positioning of image sensors can provide wider instantaneous coverage. An additional advantage lies in the fact that improved spatial resolution can be achieved by positioning the imaging sensors in a pixel staggered location so as to provide spatial sub-sampling in each IFOV. In this connection, it should be understood that pixels sample the image plane such that they are adjoining each other with minimum dead zones between them. In sampling the image at a higher sample rate but with the same pixel size (i.e. oversampling), one may achieve higher resolution by typically ~20%-30%. This can be achieved by staggering the pixels using multiple sensors, that is pixels are offset by one half or one quarter the pixel size, thereby achieving a higher sampling density. A further advantage lies in the fact that a four-fold of temporal sampling rate of fast scene changes (e.g. flash) can be rate achieved by synchronizing (e.g. via the time filters) the image detection time of the sensors.

It should be noted that though the example of FIG. 12 relates to four different sensors, the present invention is not limited to this example and extends to the use of any number of sensors.

Figure 13:
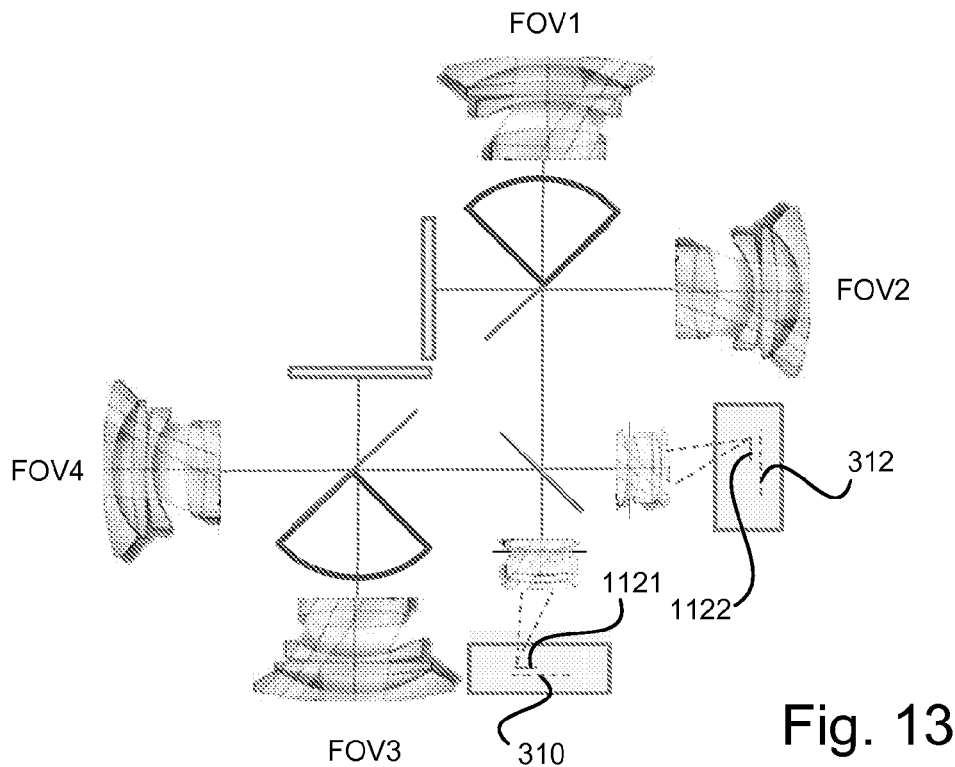
FIG. 13 illustrates a device of the present invention, comprising two sensors, each sensor being configured for receiving EM radiation from half of each FOV.

Referring now to FIG. 13, a device of the present invention comprising two sensors is illustrated. Optionally, each sensor is configured for receiving EM radiation from half of each FOV.

In FIG. 13, the device 100 includes two sensors 1121 and 1122. The guiding optics includes three beam splitters configured for projecting radiation from a plurality of FOVs (in this example four FOVs) onto each of the sensors 1121 and 1122. It can be noticed that the combined image 310 projected onto the first sensor 1121 is larger than the first sensor 1121. Similarly, the combined image 312 projected onto the second sensor 1122 is larger than the second sensor 1122. For example, the projected images have the same height as their respective sensors, but have a larger length. The first detector 1121 is placed so as to be illuminated by a first part of the combined image, while the second detector 1122 is placed so as to be illuminated by a second part of the combined image. The images detected by the sensors may be collated to provide a larger continuous image of the field of regard. This process is called optical butting. If the length of each combined image is less than twice the length of the corresponding sensor, and if the sensors have the same height and length, then the two images detected by the sensors partially overlap.

In a preferred embodiment, the device 100 is set up so that each image projected onto its corresponding sensor has twice the length of the sensor. In this case the first sensor 1121 is positioned so as to detect the first half of the projected image and the second detector is positioned so as to detect the second half of the projected image. The detected images are therefore contiguous images. When collated together, the detected images form a panoramic picture have a size that is larger than the size of the individual sensors.

Figure 14:
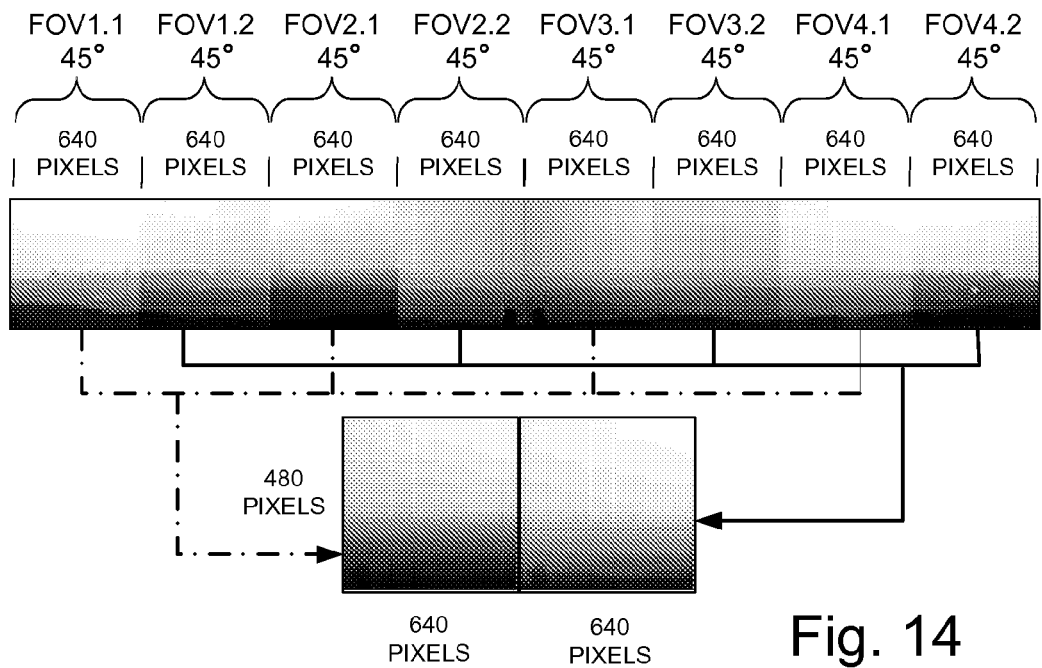
FIG. 14 illustrates an image reconstructed from combining two images (one from each of the sensors of FIG. 13), wherein each image is a combination of images projected on the sensors from different FOVs, according to some embodiments of the present invention.

The image butting of contiguous images detected by the sensors of the device of FIG. 13 is exemplified in FIG. 14.

The sensors have, for example, a length of 640 pixels and height of 480 pixels. The images projected by each FOV onto the sensors are 1280-pixels long and 480-pixels high. The first sensor 1121 detects the image FOV1.1 from FOV1, the image FOV2.1 from FOV2, the image FOV3.1 from FOV3, and the image FOV4.1 from FOV4. The combined image detected by the sensor 1121 is the left half of the combined image projected by the FOVs. The second sensor 1122 detects the image FOV1.2 from FOV1, the image FOV2.2 from FOV2, the image FOV3.2 from FOV3, and the image FOV4.2 from FOV4. The combined image detected by the sensor 1122 is the right half of the combined image projected by the FOVs. Because each FOV covers a 90-degree angle, each image detected by the sensors from each FOV covers 45 degrees.

The two combined images detected by the sensors 1121 and 1222 are collated using a suitable image processing utility, and yield a single combined panoramic image having a length of 1280 pixels and a height of 480 pixels. The resulting horizontal IFOV of the collated image in this case is 1.225 mrad (6280 mrad/4/1280=1.225 mrad). Therefore, image butting can be used to enlarge the image obtained by the two sensors without loss of the image quality, and consequently reduce the IFOV.

Due to the proximity of sensors 1121 and 1122, the sensors may be controlled and operated by a single video engine, thereby reducing costs and power consumption. The above optical butting is implemented along one axis (horizontally). However, optical butting may also be implemented along additional axis (vertically), such that for example instead of covering 8 horizontal contiguous sectors, the collated image may cover 2 vertically stacked contiguous strips of 4 horizontal contiguous sectors, resulting in a 4×2 segmented scene coverage.

Figure 15:
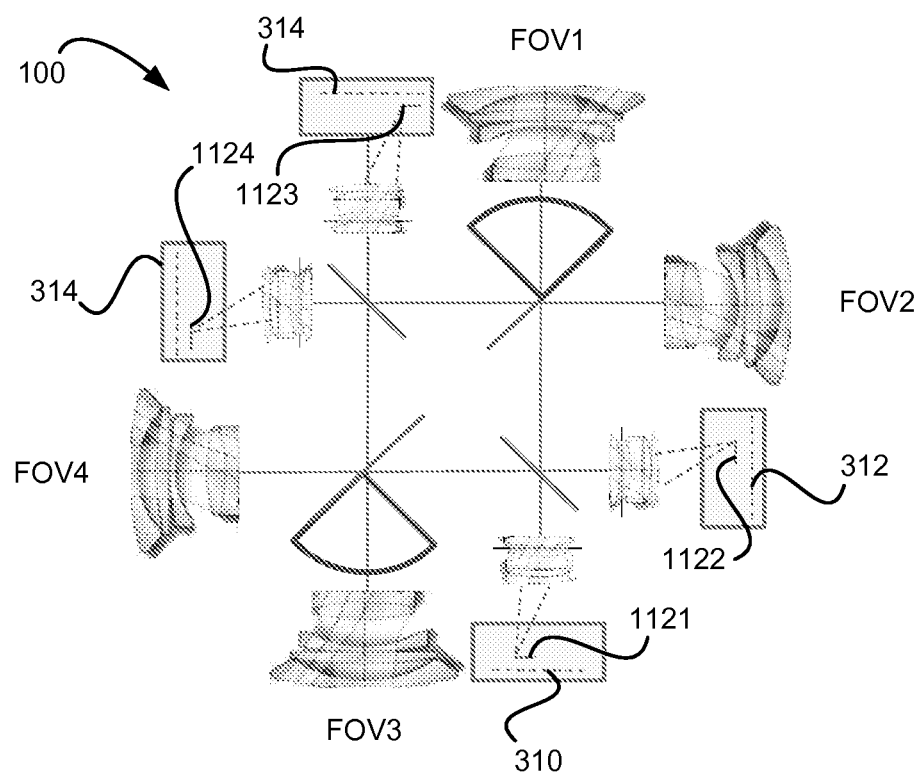
FIG. 15 illustrates a device of the present invention, comprising four sensors, each sensor being configured for receiving EM radiation from a quarter of each of the FOV.
Figure 16:
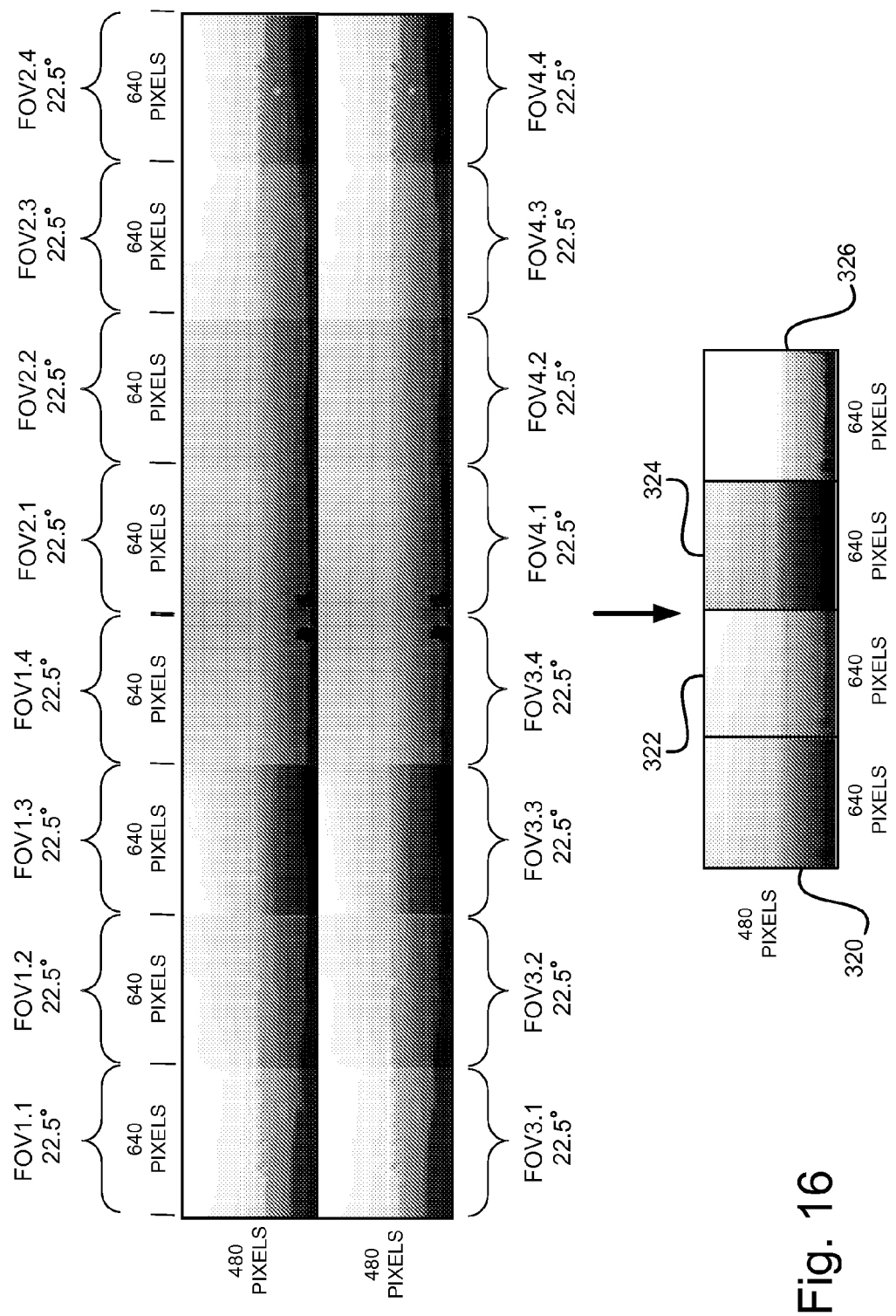
FIG. 16 illustrates an image reconstructed from combining four images (one from each of the sensors of FIG. 15), wherein each image is a combination of images projected on the sensors from different FOVs, according to some embodiments of the present invention.

Referring now to FIG. 15, there is illustrated a device of the present invention, comprising four sensors, each sensor being configured for receiving EM radiation from a quarter of each FOV. FIG. 16 illustrates image butting performed to collate images detected by the four sensors of FIG. 15.

The device 100 of FIG. 15 is generally similar to the device of FIG. 13. However, in FIG. 15, four sensors are present 1121, 1122, 1123, and 1124. Each of the sensors receives electromagnetic radiation from all of the FOVs (simultaneously or consecutively). Furthermore, an additional beam splitter is added, in order to enable EM radiation from all FOVs to reach the third and fourth sensors 1123 and 1124.

The length of the combined images (310, 312, 314, and 316) projected by the FOVs is set to be four times the length of each sensor, and the sensors have the same size. The sensor 1123 is located on the far left (first quarter) along the projected image 314. The sensor 1121 is located on the middle left (second quarter) along the projected image 310. The sensor 1122 is located on the middle right (third quarter) along the projected image 312. The sensor 1124 is located on the far right (fourth quarter) along the projected image 316. Therefore, the image 320 detected by the sensor 1123 is contiguous to the image 322 detected by the sensor 1121. The image 322 detected by the sensor 1121 is contiguous to the image 324 detected by the sensor 1122. The image 324 detected by the sensor 1122 is contiguous to the image 326 detected by the sensor 1124.

Collating the images 320, 322, 324, and 326 will produce a panoramic image having a height of 480 pixels and a length of 2560 pixels, as shown in FIG. 16. The resulting horizontal IFOV in this case is 0.613 mrad (6280 mrad/4/2560=0.613 mrad). In comparison, if we were to use such four imaging sensors with four separate 90 degree FOV optics, the resulting IFOV would be 2.5 mrad (i.e. 6280/4/640=2.45 mrad). Comparatively, the pixel size is four times larger in every dimension, that is 16 times in imaged area. Such difference can greatly affect the detection sensitivity of a system.

Due to the proximity of sensor 310 to the sensor 312 and of the sensor 314 to the sensor 316, each pair of sensors may be controlled and operated by a single video engine, thereby reducing costs and power consumption. The above optical butting may be implemented as depicted horizontally, but may also be implemented vertically, such that for example instead of covering 16 horizontal contiguous sectors, it may cover two vertically stacked contiguous strips of 8 horizontal contiguous sectors, resulting in a 8×2 segmented scene coverage.

FIGS. 17 and 18 illustrate different examples on how multidirectional image systems of the present invention can be used to detect motion in a scene.

FIG. 17 illustrates the operation of a multidirectional imaging system of the present invention, where temporally differentiating image processing is applied to detect movement, according to some embodiments of the present invention.

The device 100 of FIG. 17 is a two-stacked configuration of the imaging device of the present invention. The device 100 includes top and bottom imaging units, for collecting EM radiation from a set of four top FOVs and a set of four bottom FOVs. The top imaging unit may include, for example, the lens arrays 102, 104, 106, and 108. Similarly, the bottom imaging unit may include the lens arrays 402, 404, 406, and 408. These eight FOVs may be concurrently projected onto one two dimensional video imaging sensor by adding an additional vertical beam splitter in the optical beam path.

The scene 420 is imaged by the device 400 via four upper FOVs stacked over four lower FOVs. In the depicted example, the scene includes a moving object (man) 422. A control unit associated with the device 100 processes the video image sequence detected by the device 100 in order to extract the moving object from the combined image 430. The image processing produces the image 440 via a temporally differencing image processing algorithm to extract the moving object and other changing scene elements (e.g. leaves moved by the wind). For example such algorithm may include differencing between consecutive video frames, or differencing between two differently temporally weighted averages of said image sequence, utilizing for example temporal finite impulse response (FIR) filters or infinite impulse response (IIR) filters. The image 440 is then processed by a thresholding algorithm (morphological processing) which removes clutter but retains the moving object, as seen in the output image 450.

FIG. 18 illustrates the operation of a multidirectional imaging system of the present invention, where spatially differentiating and temporally differentiating image processing techniques are applied to detect movement, according to some embodiments of the present invention;

At 510, a multidirectional imaging device 100 according to the present invention is shown, along with images from four FOVs. The imaging device includes time filters for determining the FOV in which the movement event occurs. The image 520 is the combined image from all the FOVs detected by the sensor of the device 100. The combined image 520 is fed into video utility, which displays subsequent frames of the combined image one after the other.

A temporal differencing process of the video produces the image 530, that is further contrast-enhanced by a spatial filtering process which produces the image 540. In image 540, the moving object is easily distinguished. Further morphological processing (thresholding) is applied to extract moving blobs and produce the image 550. Once a moving object is detected and preferably tracked by image processing, the system of the present invention may operate the time filters to project each FOV separately onto the sensor while blocking the others. Image processing is then performed for each separate image sequence of each FOV to detect motion, as shown in the images 560. The image 550 in which the motion from the combined image 520 is detected, is correlated with the images 560 corresponding to the different FOVs. In this manner, the FOV in which the object is actually located is identified and optionally tracked (image 570). Image 580 is a cropped image of the moving object which can then be stored, transmitted or further processed. This is particularly effective in applications where objects to be detected move consistently and sufficiently in the scene hence enabling such detection and time-switching.

Figure 19A:
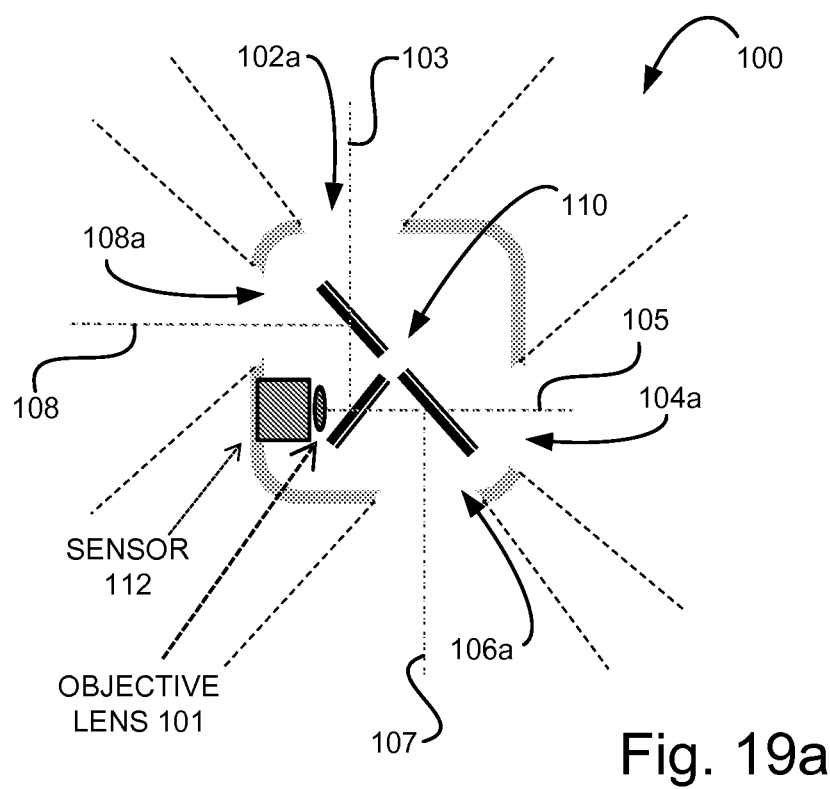
FIGS. 19a-19b illustrate an example of the implementation of the present patent application, as a camera using concurrent optical projection of multiple optical FOVs onto a single sensor.
Figure 19B:
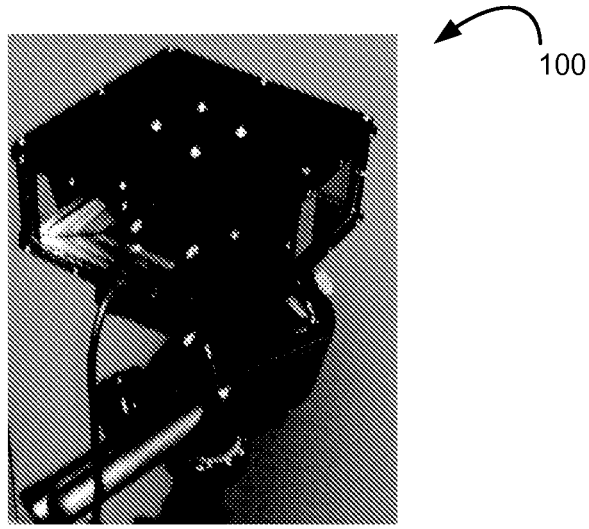

Referring now to FIGS. 19*a*-19*b* an example of the implementation of the present patent application is illustrated, as a camera using concurrent optical projection of multiple optical FOVs onto a single sensor.

In FIG. 19*a*, a schematic drawing of the camera is shown, and in FIG. 19*b*, an image of the camera is shown. The device 100 collects EM radiation via four apertures 102*a*, 104*a*, 106*a*, 108*a*, as mentioned above. The guiding optics 110 includes three beam splitters, as described above, and directs the EM radiation from the apertures to a single objective lens arrangement 101 located in the proximity of the sensor 112. In this manner concurrent optical projection of multiple optical FOVs on one imaging sensor is effected. The panoramic field of regard coverage is achieved with four 90 degree FOVs. In the current example, the beam splitters are located very close (e.g. several millimeters depending on the lens aperture and the FOV) to the objective lens arrangement 101, in order to maintain small dimensions of the beam splitters and therefore the small dimension of the camera itself.

Figure 20:
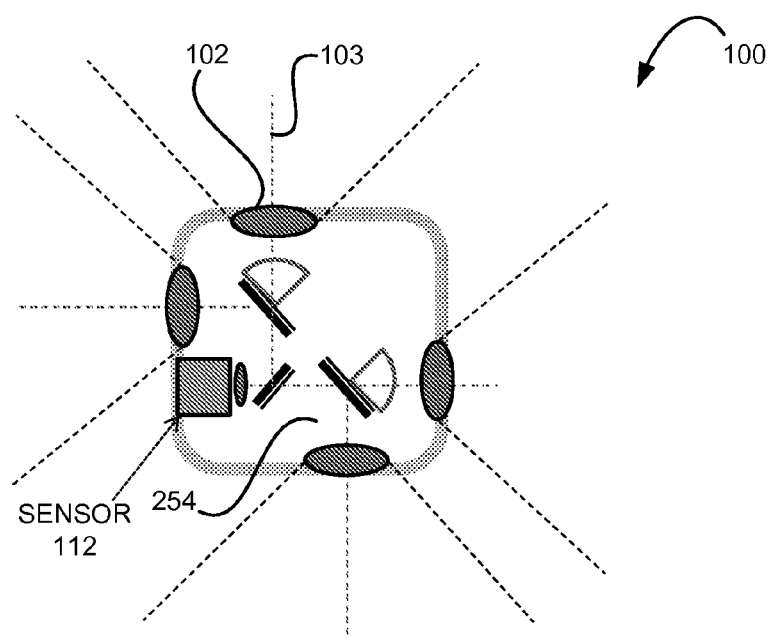
FIG. 20 illustrates an example of the implementation of the present patent application, as a camera using concurrent optical projection of multiple optical FOVs onto a single sensor, where EM radiation from each FOV is filtered in a unique manner before reaching the sensor.

FIG. 20 illustrates an example of the implementation of the present invention, as a camera using concurrent optical projection of multiple optical FOVs onto a single sensor, where EM radiation from each FOV is filtered in a unique manner before reaching the sensor.

The structure and operation of the camera 100 are described above with reference to the example of FIG. 8. This embodiment enables an implementation with reduced dimensions and optical design flexibility of the lenses. The temporal filters enable several imaging modes, including concurrent multiple FOV projection and processing, as well as sequential FOV projection and processing.

Figure 21:
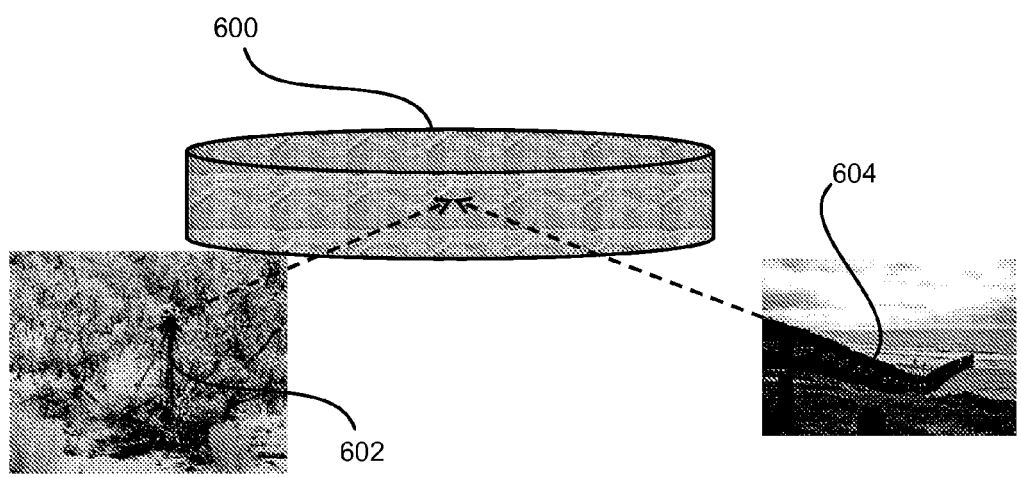
FIG. 21 illustrates different implementations of the example of FIG. 20 that may be used in the field.

FIG. 21 illustrates different implementations of the example of FIG. 20 that may be used in the field.

Image 600 is a panoramic coverage by stitched FOVs into a continuous image. This image may be produced by processing image data collected by an unattended ground imager 602 for open field monitoring applications, or an unattended ground imager 604 for monitoring elongated fences and border lines. The camera of FIG. 20 may be configured as a miniaturized camera that may be handheld or portable, and may be used for detecting panoramic scene changes (events) such as moving objects, gun flashes and firearms, explosions etc.

Figure 22A:
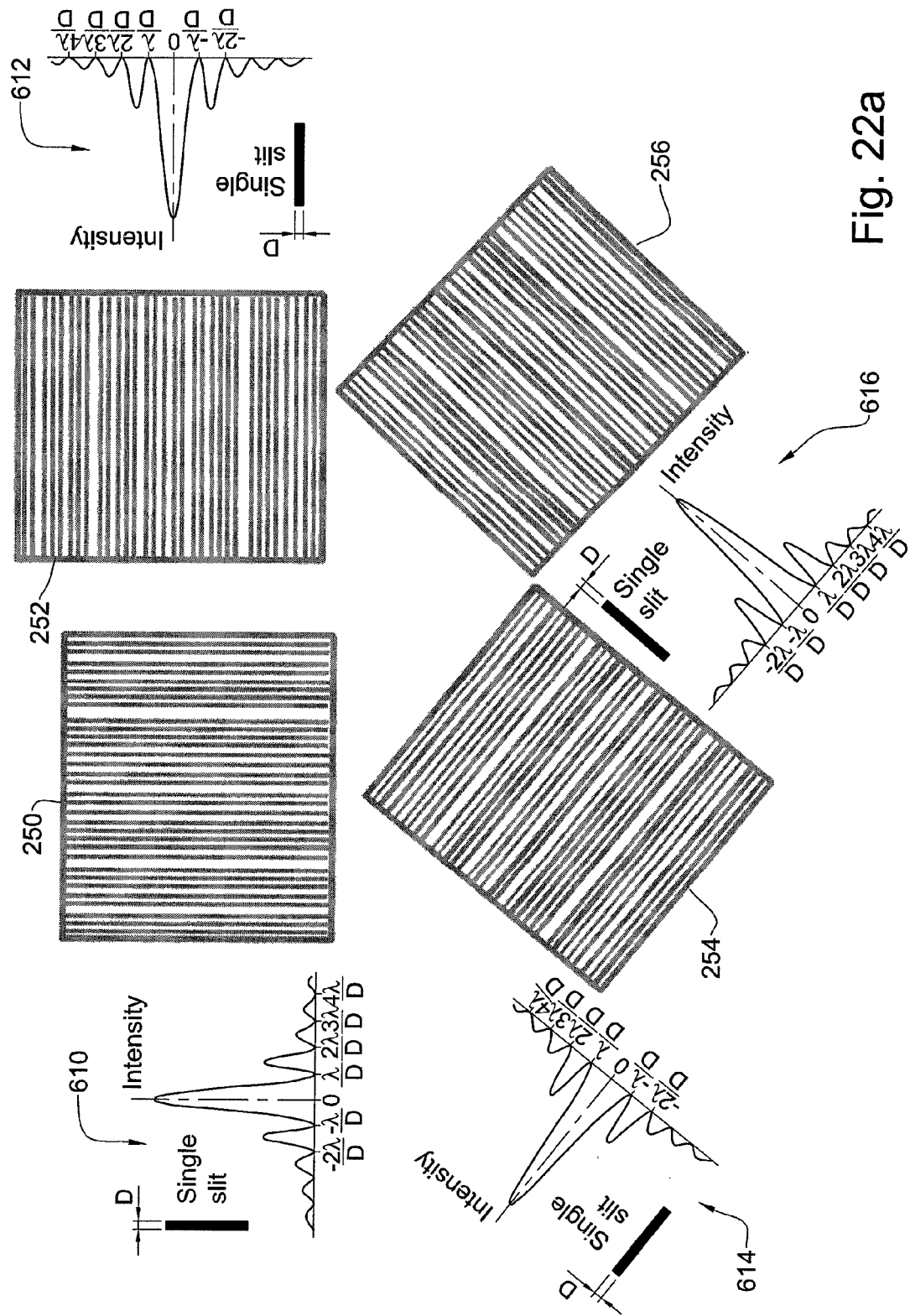
FIG. 22a illustrates four differently oriented diffraction gratings that can be used as optical filters, according to some embodiments of the present invention.

FIG. 22a illustrates four differently oriented diffraction gratings that can be used as optical filters, according to some embodiments of the present invention. FIGS. 22b-22h illustrate examples of imaging via one or more diffractions gratings.

The optical filters 250, 252, 254, 256 can be used as described above, in order to identify the FOV in which an event occurs. The use of diffraction grating as a filter is advantageous for some specific applications, since for small changing scene effects (such as a flash or a point target) the diffraction produce a filtered signal which spreads only along the respective grating orientation of the specific FOV, as shown in graphs 610-616. The spreading is in accordance with the diffractive theory of light, whereby a central component of the signal occurs at the pixel location of the object in the imaged scene, while the diffracted modes appear on either side of the central component along the grating's orientation. The distance between the central component and the diffracted modes is determined by the optical parameters of the imaging device and the grating frequency.

The use of gratings provide three important advantages, including (a) the determination of the FOV, (b) the reducing of the background spatial clutter, and (c) the ability to further analyze and utilize the spectrum of the effect in the detection process.

Figure 22B:
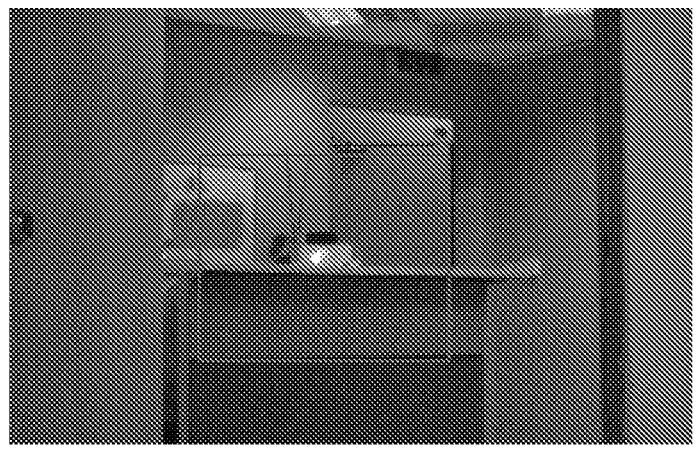
FIGS. 22b-22h illustrate examples of imaging via one or more diffractions gratings.
Figure 22C:
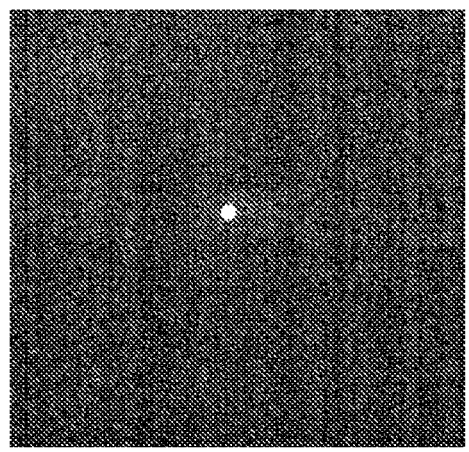
Figure 22D:
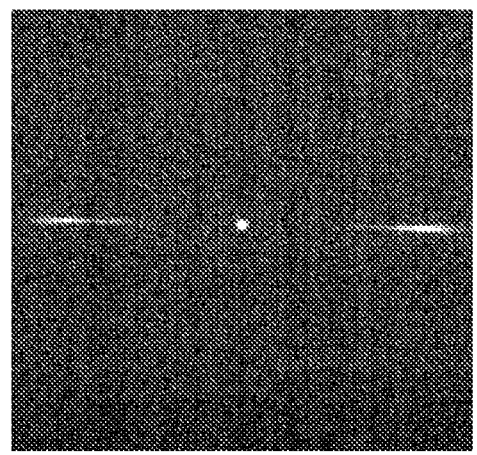
Figure 22E:
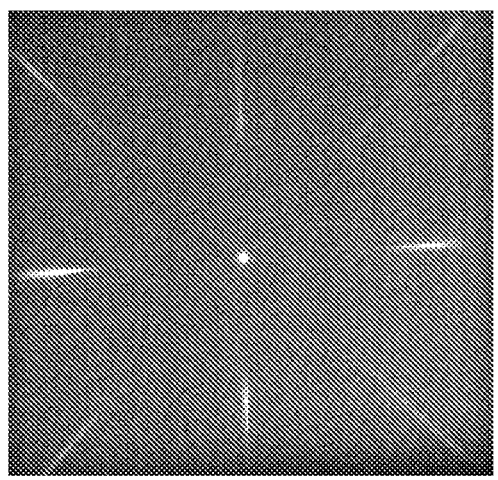

FIG. 22b depicts an exemplary recording of a 30 degree FOV scene taken at long exposure (6.5 milliseconds) with a small flash effect. FIG. 22c depicts the same scene (framed region of FIG. 22b), without a grating and with a shorter exposure time (0.08 milliseconds), where the surroundings disappear (due to the short exposure time) while the flash point is clearly evident. FIG. 22d depicts the same scene (framed region of FIG. 22b) filtered by a single vertically-oriented grating (frequency 80 line pairs/millimeter) and captured at a longer exposure time (0.25 milliseconds). The three-fold increase in the exposure time compensates for the loss of signal due to the grating. FIG. 22e depicts the same scene (framed region of FIG. 22b) captured at a 3.9-millisecond exposure time and filtered by two superimposed gratings oriented perpendicularly to each other. The 90 degrees orientation difference between the two gratings results in a two-dimensional cross-like spreading of the point target along the horizontal and vertical axis (at a 3.9 millisecond exposure time). The 15-fold increase in exposure time compensates for the loss of signal of the double grating. The use of such double gratings reduces significantly the clutter background.

As can be seen from FIGS. 22b-22d, the introduction of the grating spectrally blurs the image, eliminating the background, and therefore increases the detectability of the flash event. At the same time, the intensity of the radiation that reaches the sensor is also diminished, requiring a higher exposure of the sensor in order to compensate for this intensity decrease.

Figure 22F:
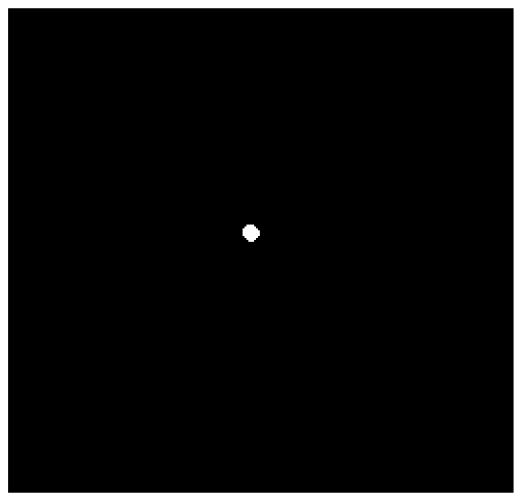

FIG. 22f is an image processed (thresholded) detection result of the image of FIG. 22c. It can be seen that the detection result does not provide any information which can be used to identify the FOV in which the flash occurred.

Figure 22G:
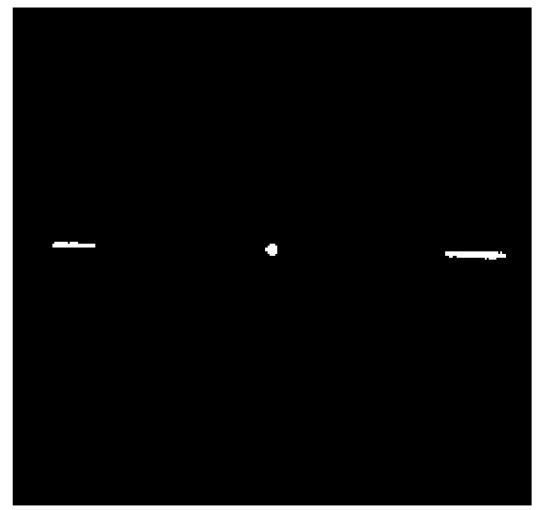
Figure 22H:

FIG. 22g is an image processed (thresholded) detection result of the image of FIG. 22d. The respective first diffraction modes are associated spatially and temporally with the central component: in fact the first diffraction modes are a certain distance apart from the central component and are found in the same frame as the central component. This double association (spatial and temporal) can be used to positively identify the orientation of the grating and therefore the respective FOV. It should be noted that, in a configuration in which four FOVs are present, four gratings oriented at about 45-degree differences can be used to differentiate between four FOVs. In some embodiments, four gratings having different frequencies are used. In this case, the distance between the central component and the first diffracted modes can be used to differentiate between the FOVs.

FIG. 22g is an image processed (thresholded) detection result of the image of FIG. 22e. As before, the first modes are associated spatially and temporally with the central component. In this manner, the orientation of the grating can be determined, and therefore of the FOV in which the event occurred can be identified. In some embodiments of the present invention, four double gratings oriented at about 22.5 degree differences can be used to differentiate between the FOVs.

Another example for an optical filter may be a dispersive element oriented according to a predetermined angle. Spectrum of a point target filtered via the dispersive element is dispersed along said dispersion angle. This enables use of oriented image processing filters matched to said orientation to correctly determine the FOV in which the point target was present.

Both the grating elements and the dispersive elements provide spectral decomposition of the scene. For example, in the scene filtered through the grating(s) of FIGS. 22d-22e, the lines representing the first diffraction modes are spectral decompositions of the light from the flash event. Therefore, filtering through a diffractive or a dispersive element can be used not only to differentiate between the FOVs, but analysis of the spectral content of EM radiation from a certain event can be used in order to identify the nature of the event.

FIGS. 23a-23d illustrate an example in which a device of the present invention is used on a vehicle for detecting firing of a weapon in a field of regard surrounding the vehicle.

Figure 23A:
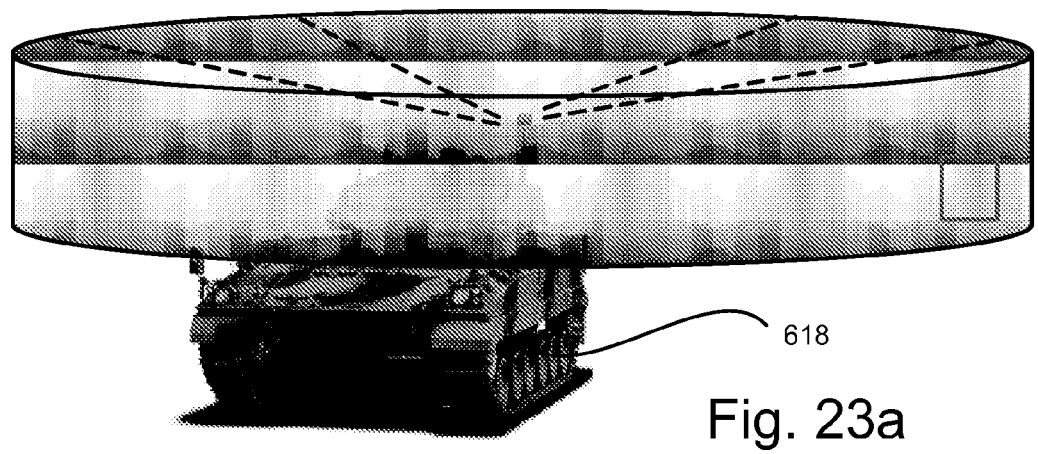
FIGS. 23a-23d illustrate an example in which a device of the present invention is used on a vehicle for detecting firing of a weapon in a field of regard surrounding the vehicle.

In FIG. 23a, a miniaturized panoramic imaging device 100 is installed on top of a vehicle 618 (e.g. a fighting vehicle, such as a tank). The device 100 is associated with a control unit and configured for detecting firearms, missile launchings and rocket launches in order to protect the vehicle.

Figure 23B:
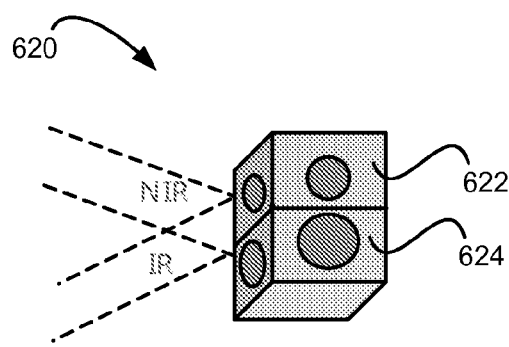

In FIG. 23b, an example of an imaging apparatus 620 is shown. The imaging apparatus 620 includes a multidirectional imaging device 622 configured for detecting radiation in the near infrared (NIR) spectrum and a multidirectional imaging device 624 configured for detecting radiation in the infrared (IR) spectrum. The devices 622 and 624 have the same or similar configuration and operation modes of any one of the devices 100 described above.

Four imaging apparatuses 620 for a multispectral panoramic firing, launching or change detection may be distributed over (preferably assembled at) the corners of the vehicle

Figure 23C:
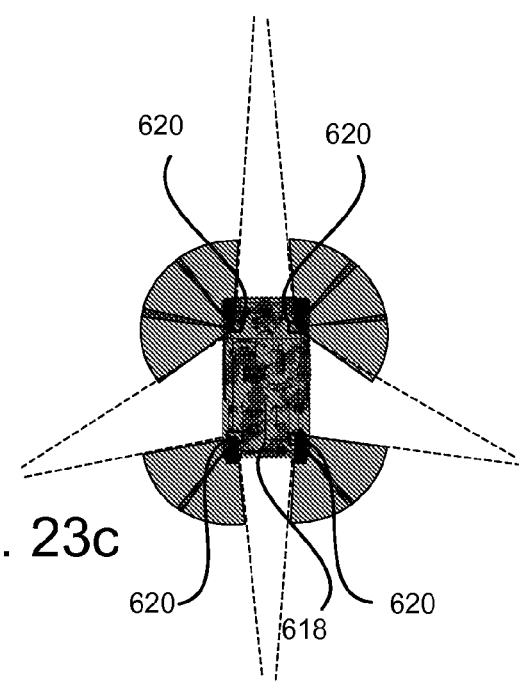
Figure 23D:
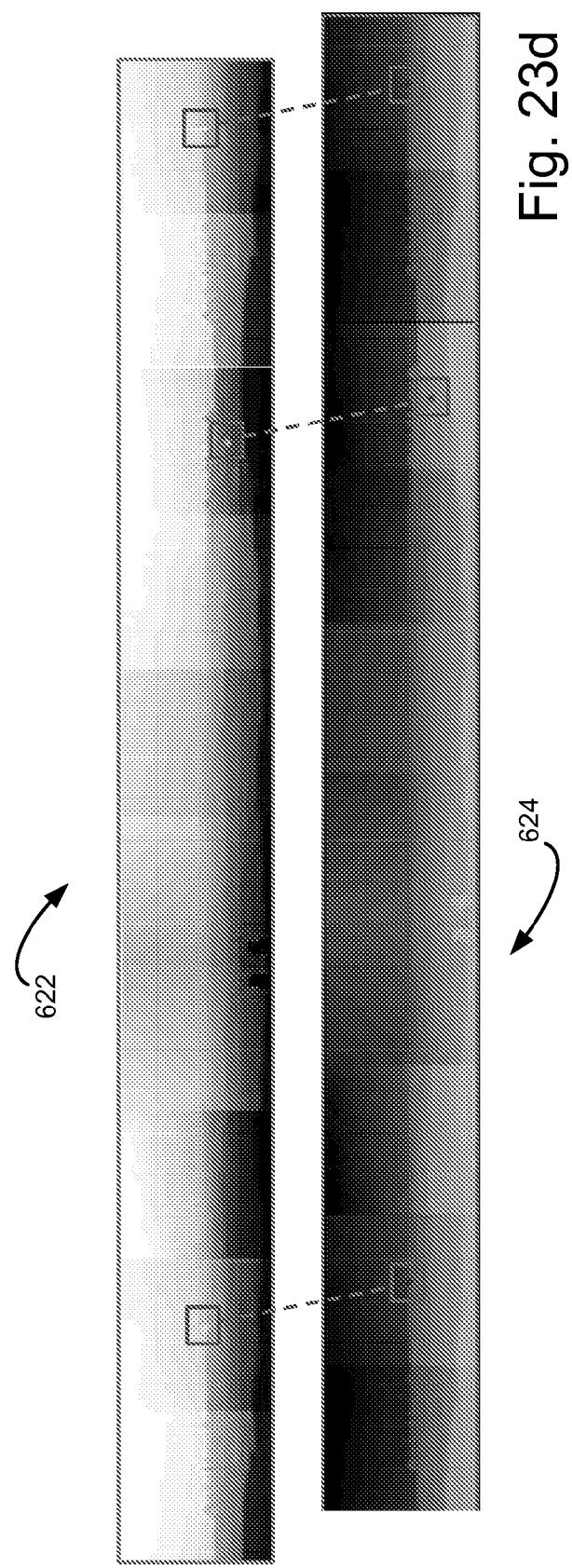

618, as shown in FIG. 23c. In this manner, each apparatus 620 (in association with a control unit) provides wide FOR sector coverage.

The images 622 and 624 depict two stitched panoramas in two different spectral bands, namely NIR and LWIR, respectively. The advantage of working in two spectral bands, is that the detection process can utilize the spatio temporal correlation between two such detected (e.g. flash) events in two spectral bands (NIR, LWIR), respectively in order to positively identify the event. For example the LWIR channel (generally requiring a low-cost uncooled thermal imager) may be used for preliminary detection processing, and the NIR channel (e.g. CMOS larger format and high frame rates) may be used as secondary verification processing, or vice versa.

Figure 24A:
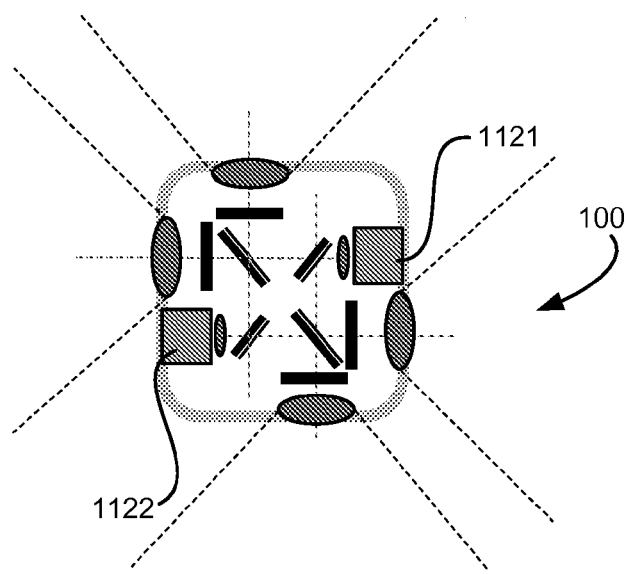
FIGS. 24a-24b illustrate an example in which a device of the present invention comprising two sensors can be used for obtaining a multispectral image of the field of regard.
Figure 24B:
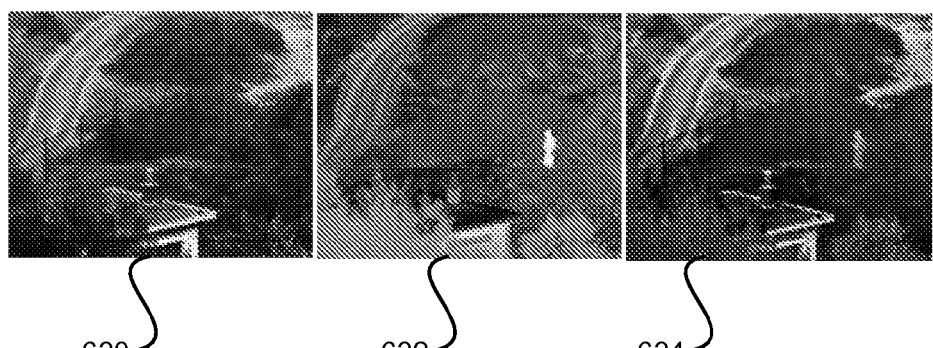

FIGS. 24a-24b illustrate an example in which a device of the present invention comprising two sensors can be used for obtaining a multispectral image of the field of regard.

In FIG. 24a an example of the present invention is shown, in which a multidirectional imaging device 100 includes two sensors 1121 and 1122. Each sensor receives EM radiation from all FOVs, as described above. Optionally, the device 100 includes optical and/or temporal filters. The sensor 1121 operates in the visible (VIS) spectrum, while the sensor 1122 operates in the IR spectrum. The two sensors are positioned so as to relay their image data to a single control unit. In this manner, the control unit can perform specialized image processing, such as multispectral imaging and image fusion.

In FIG. 24b, the image 630 is detected by the sensor 1121, operating in the visible range, and the image 632 is detected by the sensor 1122 operating in the IR spectrum. The image 634 is a combination image, produced by digital fusion of images 630 and 632. The combination image is useful both for display and detection purposes. In the case of display, one enables fused image information from NIR and LWIR bands of a given scene on a single display.

Figure 25A:
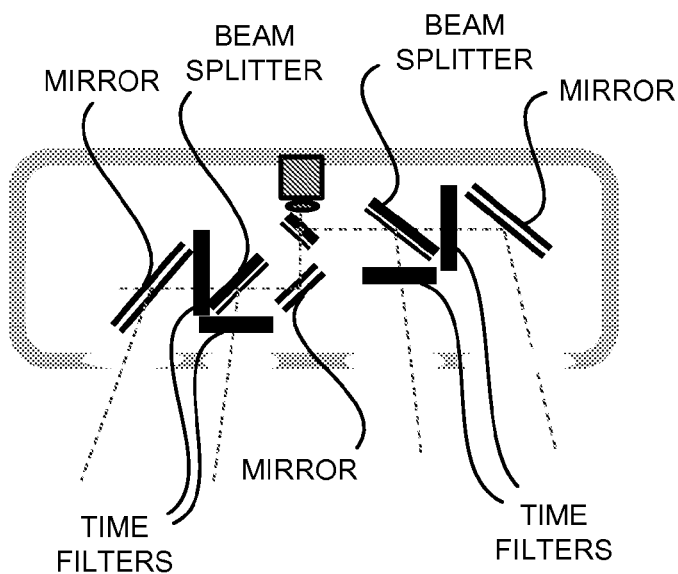
FIGS. 25a-25c illustrate examples in which devices of the present invention can be used to provide rapid step-stare scanning of a large field of regard from an airborne platform.
Figure 25B:
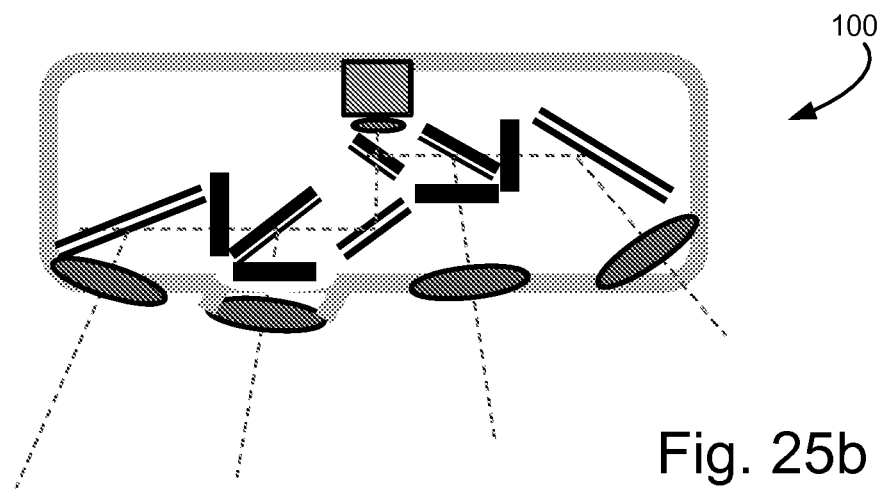
Figure 25C:
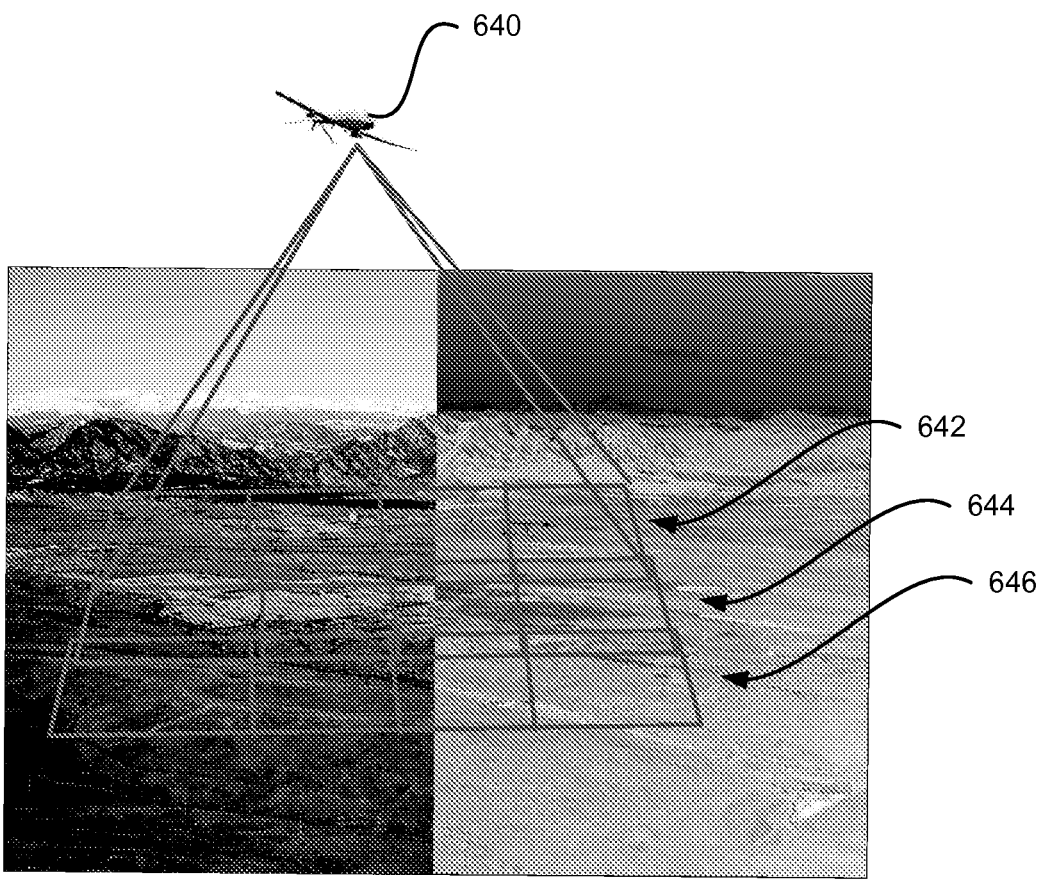

FIGS. 25a-25c illustrate examples in which devices of the present invention can be used to provide rapid step-stare scanning of a large field of regard from an airborne platform.

FIG. 25a depicts an embodiment of a concurrent optical projection of multiple optical FOVs on one imaging sensor, wherein the guiding optics are positioned in front of an objective lens arrangement, and wherein optical switches (temporal filters) are positioned in the optical path associated with each of the FOVs, thereby providing rapid step-stare scanning of a large field of regard in an airborne platform. FIG. 25b depicts another implementation of a concurrent optical projection of multiple optical FOVs on one imaging sensor, wherein the guiding optics are positioned between an objective imaging lens and a refractive element (relay lens). Temporal filters are positioned in each optical path associated with each of the fields of view, thereby providing rapid step-stare scanning of a large field of regard in an airborne platform (UAV, manned aircraft, balloon etc).

The devices of FIGS. 25a and 25b are meant for imaging a field of regard from above. Therefore, the FOVs do not provide a panoramic image. It should be noted that even though the devices of FIGS. 25a and 25b are depicted having a single sensor, two different sensors can be used in each of the devices, for example to image the field of regard in different spectral bands.

FIG. 25c depicts the operation of the device similar to that of FIG. 25a or 25b, when mounted on an airborne platform, such as the UAV 640. Images of the fields of regard 642, 644, and 646 are taken in quick succession, and can be considered approximately simultaneous. Therefore images of the fields of regard 642, 644, and 646 can be collated to generate a map of a combined field of regard.

Figure 26A:
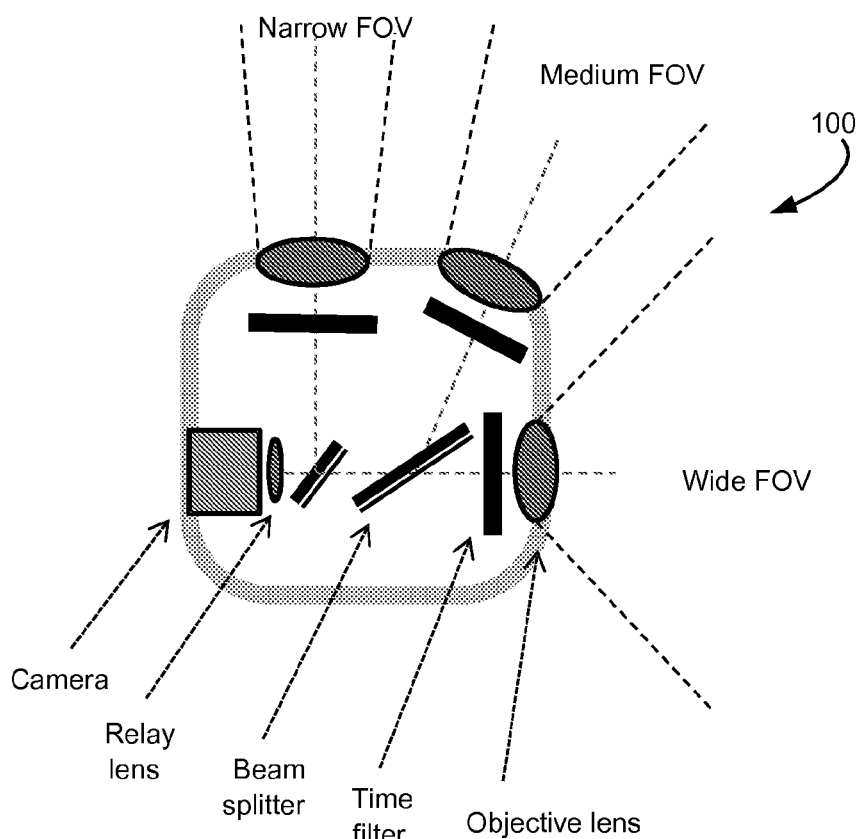
FIGS. 26a-26b illustrate an example in which a device of the present invention is used to view scenes from different ranges at substantially the same lateral spatial FOV along an extended corridor.
Figure 26B:
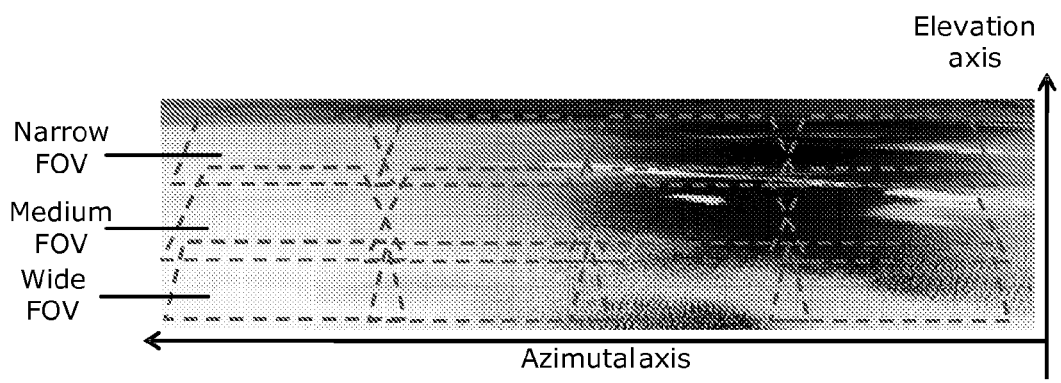

FIGS. 26a-26b illustrate an example in which a device of the present invention is used to view scenes from different ranges at substantially the same spatial discrimination level.

FIG. 26a depicts a device 100 for multidirectional imaging is provided. The objective lens arrangement and the refractive element (relay lens) are chosen so as to provide different FOVs, and therefore multiple magnifications. Time filters are positioned in each of the fields of view to provide rapid step-stare scanning. This embodiment may support applications in which the observation range varies significantly between the different FOVs.

FIG. 26b illustrates an example of a mode of operation of the device 100 of FIG. 26a, as part of a large field of regard surveillance system. The surveillance system surveys a coastal sea region. The closer region is imaged via a wide FOV (low magnification). The mid-range region is imaged using a medium FOV (medium magnification). The farther ranges are imaged using a narrow FOV (high magnification). In this manner, the spatial discrimination (image quality) is generally constant for all ranges.

The system can be operated by combining all FOVs for detecting targets in the sea with a single imager and processor. Upon a suspected detection, time filtering is applied and detection is selectively performed in each FOV. The images of the object from the different FOVs are correlated with the combined image in order to determine the FOV in which the target is actually located.

The device 100 provides elevation axis coverage without having to vertically scan the device 100. Along the azimuth (horizontal) axis, the system may be either scanned mechanically using a panning pedestal, or may utilize multiple identical overlapping imagers such that the entire region is covered without any mechanical scanning elements. This may also be particularly useful in shipborne surveillance applications and observation systems that are installed on high observation masts.

Figure 27:
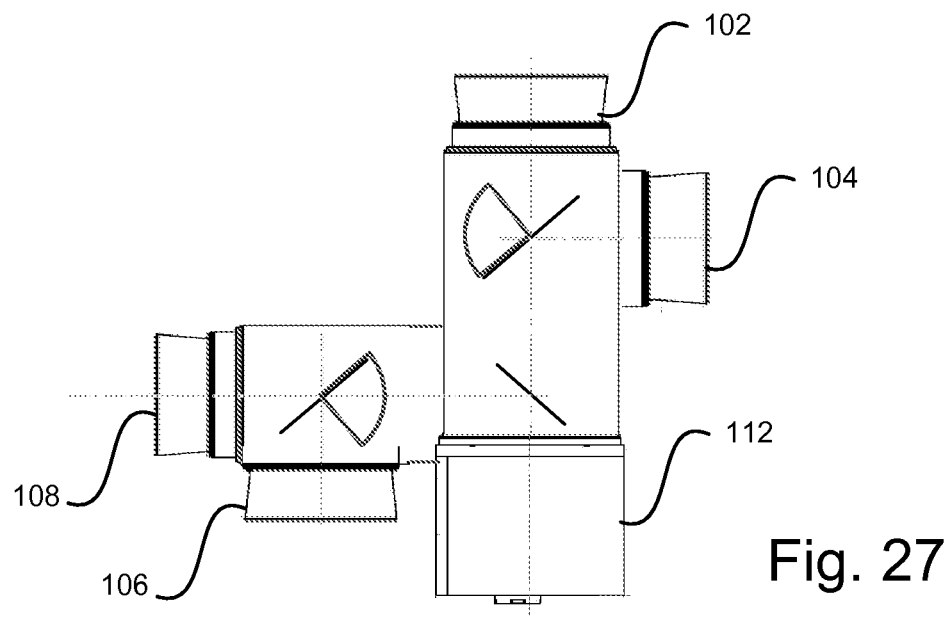
FIG. 27 is a schematic drawing of a thermal camera according to the present invention.

FIG. 27 is a schematic drawing of a thermal imaging camera, according to the present invention. The thermal imaging camera of FIG. 27 includes a single sensor 112, multiple FOVs defined by multiple objective lens arrangements 102, 104, 106, 108, and temporal filters in the guiding optics. All of these elements are described above.

Figure 28:
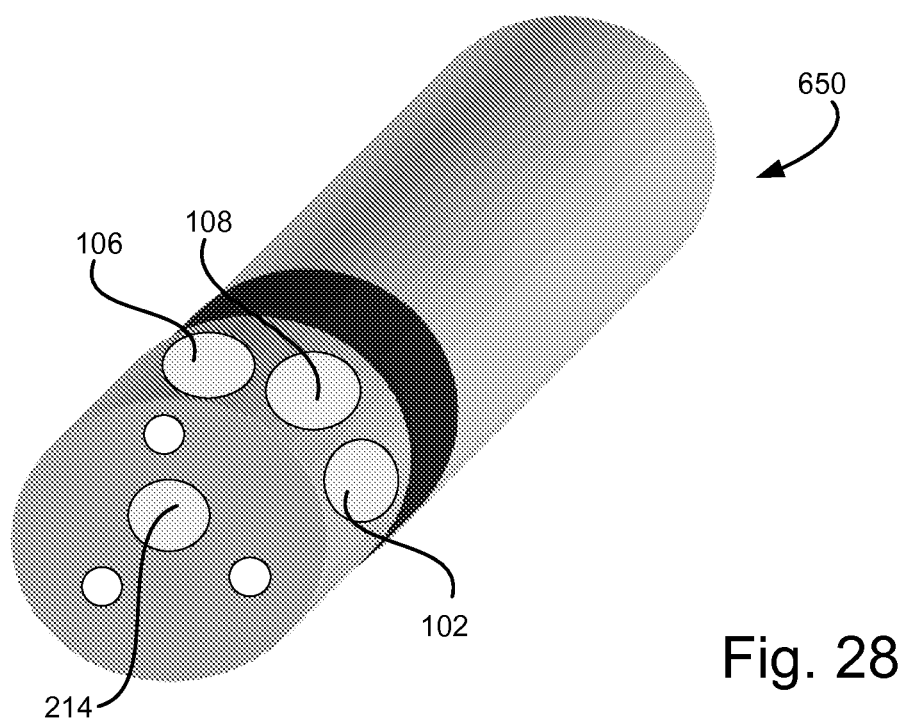
FIG. 28 is a schematic drawing exemplifying the implementation of some embodiments of the present invention within an endoscope.

FIG. 28 is a schematic drawing exemplifying the implementation of some embodiments of the present invention within an endoscope 650.

The FOVs of video endoscopy cameras are typically large (e.g. 140-170 degrees) in order to enable the physician to observe and detect tissue anomalies, not only in the front of the endoscope distal tip but also peripherally as such anomalies may be visible intermittently before being occluded by tissue folds. It is desired to provide instantaneously as large a FOR as possible.

The endoscope 650 is configured generally similar to the device 100 of FIG. 5, and includes a frontal objective lens arrangement 214 as well as a plurality of peripheral lens arrangements 102, 104, 106. The sensor (not shown) is divided into peripheral parts and a central part. The peripheral parts of the imaging sensor are used for detecting images from peripheral FOVs defined by the lens arrangements 102, 104, 106. The central part of the sensor is used for detecting images collected by the frontal objective lens arrangement 214. In this preferred embodiment a single image readout is used, and image processing is further used for decomposing the image to the respective FOVs for further appropriate display and analysis.

Figure 29:
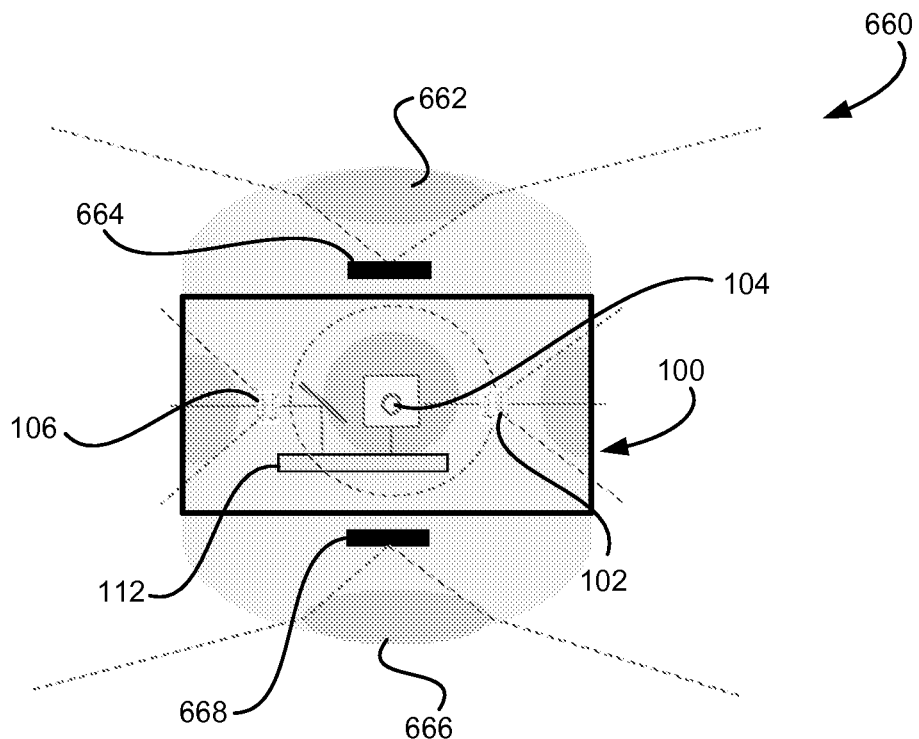
FIGS. 29-31 are schematic drawings exemplifying the implementation of some embodiments of the present invention within a capsule endoscope.
Figure 30:
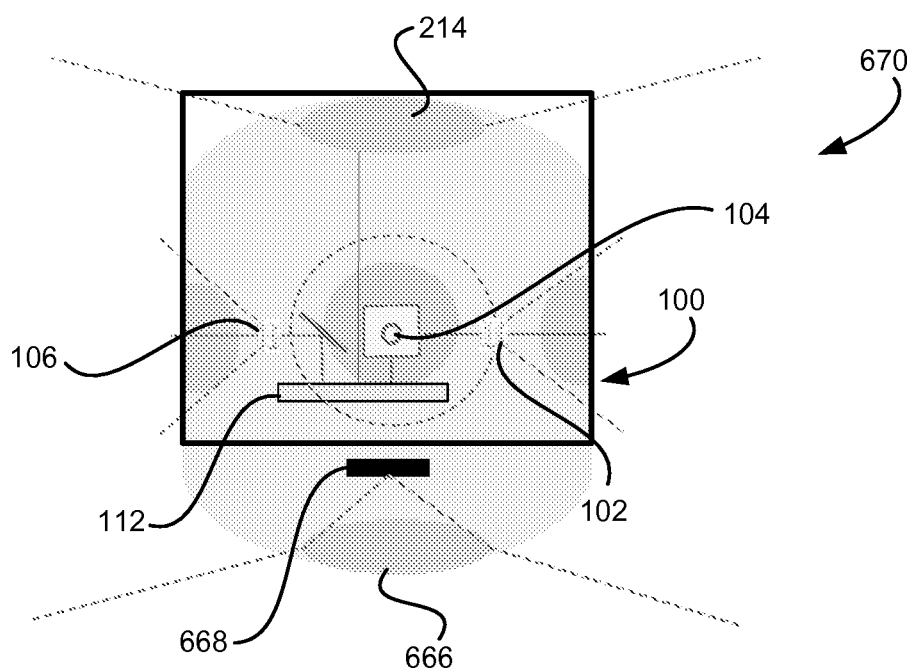
Figure 31:
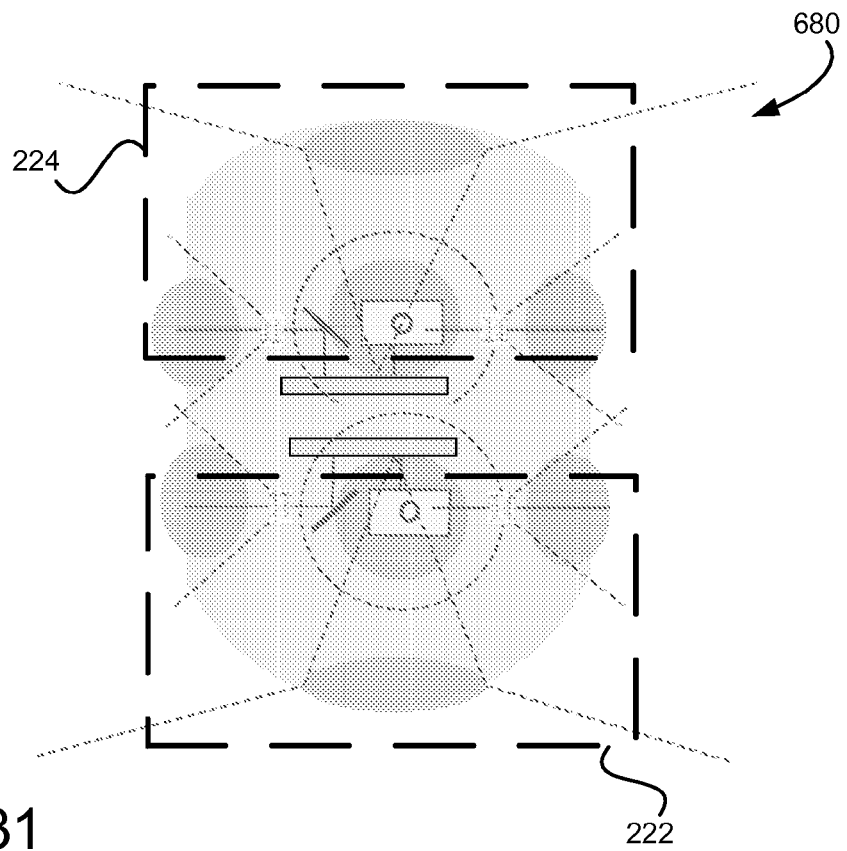

FIGS. 29-31 are schematic drawings exemplifying the implementation of some embodiments of the present invention within a capsule endoscope.

In FIG. 29, a capsule 660 includes a frontal camera and a rear camera. In the frontal camera, EM radiation is collected by a lens arrangement 662 and detected by a sensor 664. In the rear camera, EM radiation is collected by a lens arrangement 666 and detected by a sensor 668.

The central body of the capsule is designed similar to device 100 of FIGS. 2 and 3, which includes four objective lens arrangements (only two of which—102 and 106—are shown in the figure), a sensor 112, and four mirrors for guiding EM radiation collected by the objective lens arrangements to respective sections/portions of the sensor 112. The central body of the capsule is therefore configured for peripheral imaging of the lumen wall of gastrointestinal upper and lower lumen.

In FIG. 30, a capsule 670 includes a rear camera (where EM radiation is collected by a lens arrangement 666 and detected by a sensor 668), and multidirectional camera configured as the device 100 of FIG. 5. The sensor 112 of the multidirectional camera may be segmented into nine sections (as shown in FIG. 5), or into five section (as shown below in FIGS. 32b and 32c).

In FIG. 31, a further embodiment of the present invention is illustrated, wherein a capsule 680 is designed according to the device 220 of FIG. 6. The capsule includes two back-to-back imaging units 222 and 224 projecting FOVs onto opposite sides of a two-sided sensor. The imaging unit 222 collects EM radiation from the rear and peripheral FOVs, while the imaging unit 224 collects EM radiation from the front and peripheral FOVs. Each side of the sensor is divided for example into nine portions (eight peripheral and one central) or five portions (four peripheral and one central, as shown below in FIGS. 32b and 32c). In the case where each sensor side is divided into five portions, the capsule 680 includes ten lenses, i.e. five lenses for each sensor (one central and four peripheral).

Figure 32A:
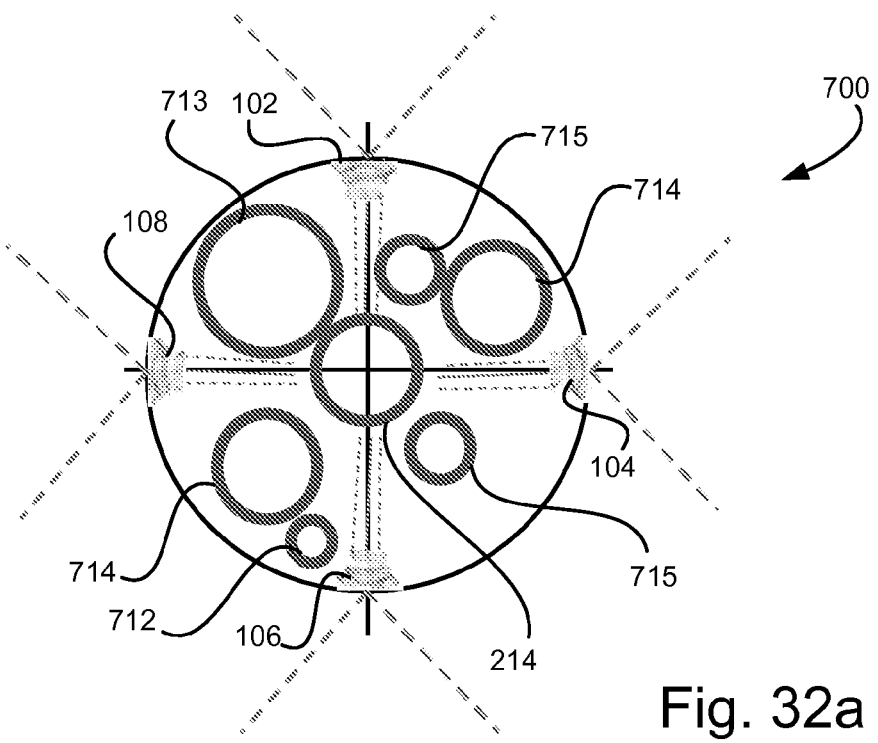
FIGS. 32a-32c illustrate examples of an endoscope having the capability of multidirectional imaging, according to some embodiments of the present invention.
Figure 32B:
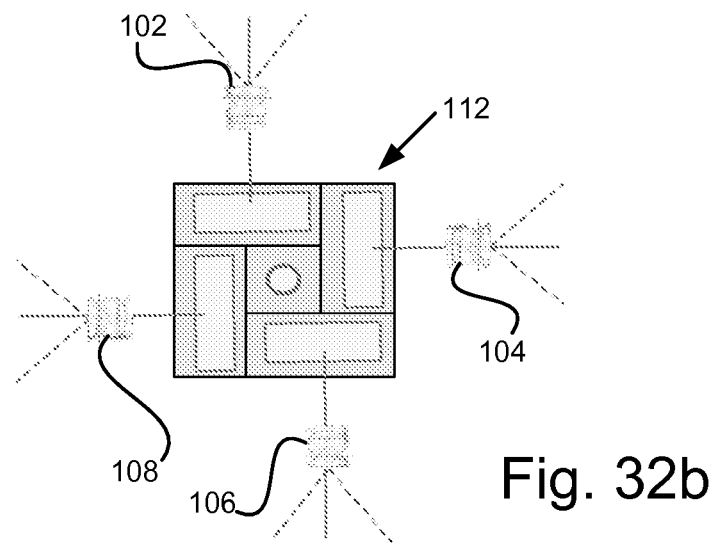
Figure 32C:
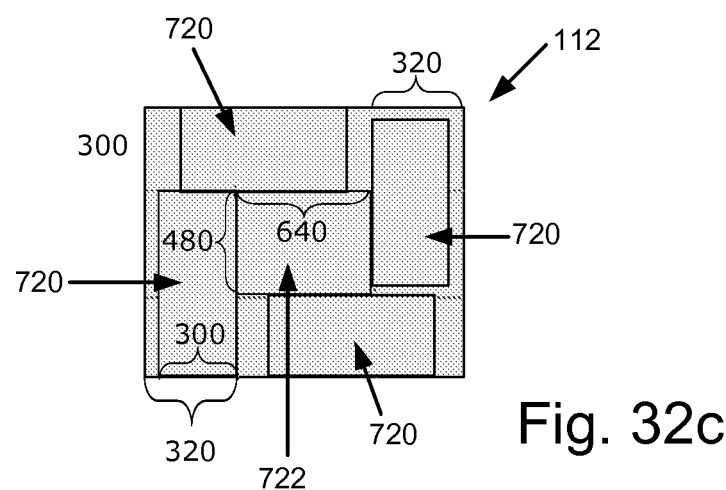

FIGS. 32a-32c illustrate examples of an endoscope having the capability of multidirectional imaging, according to some embodiments of the present invention.

In FIG. 32a, a front view of an endoscope 700 is illustrated. In FIG. 32b, the inner structure of the endoscope's imaging part is illustrated from the same point of view. The endoscope includes a camera configured similar to the imaging device 100 of FIG. 5. A central objective lens arrangement 214 collects EM radiation from a FOV in front of the endoscope, while four peripheral lens arrangements 102-106 collect EM radiation portions from peripheral FOVs. A sensor 112 is divided into four peripheral sections and one central section. Mirrors reflect EM radiation from corresponding peripheral FOVs onto the peripheral sections of the sensor. The EM radiation collected by the central objective lens arrangement 214 is directed to the central section of the sensor.

According to another embodiment, the endoscope's imaging part may include two imaging sensors: one sensor for the frontal imaged FOV, and one sensor for the peripheral imaged FOVs. The two sensors may be positioned close to each other or back-to-back with respect to each other.

The endoscope 700 can image both the front of the endoscope and the sides of the endoscope. This is in contrast to endoscope cameras known in the art, in which the coverage (generally 120-170 degrees) of endoscopic camera units is not sufficient in imaging tissue areas that may be occluded behind tissue folds. Peripheral imaging may enable such imaging of areas where tissue anomalies may appear and provide important early diagnostic information on polyps, lesions etc.

It should be noted that in the endoscope 700 of the present invention, the endoscope's functional units (water flushing and insufflations channel 712, working channel 713, illuminators 714, and water sprayers 715) are positioned in a manner that allows the optical paths of the peripheral fields of view to access the sensor 112.

FIG. 32c illustrates an example of how the sensor can be divided into multiple sections. A 1280×1080 pixel CMOS imaging sensor 112 may be segmented as follows: the central section 722 is 640-pixels-long and 480-pixels-high, while each of the four peripheral sections 720 measures 780×300 pixels.

Figure 33A:
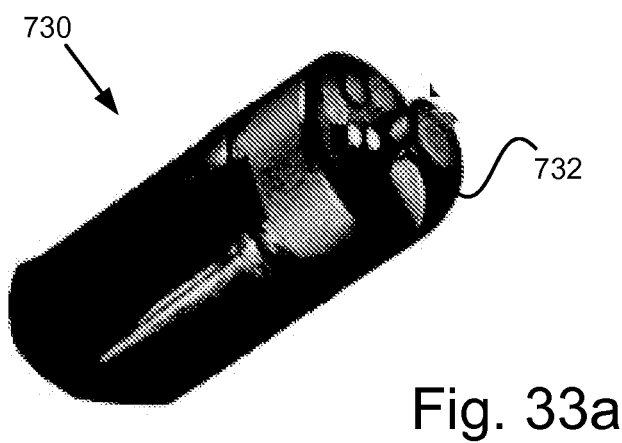
FIGS. 33a-33c illustrate an example of an endoscope having an imaging unit within a distal tip element, according to some embodiments of the present invention.
Figure 33B:
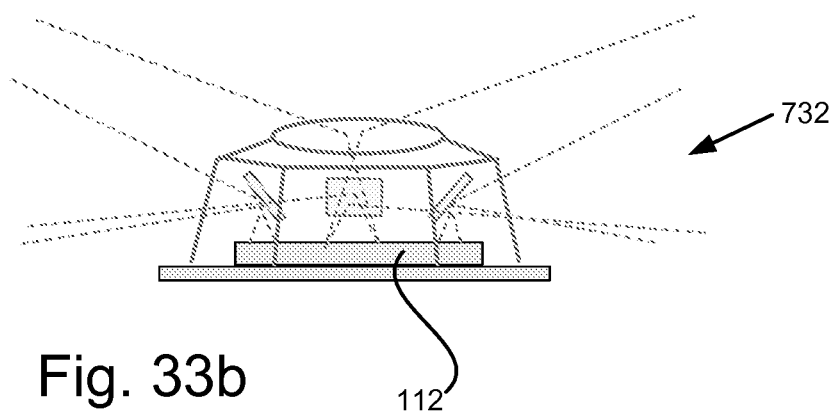
Figure 33C:
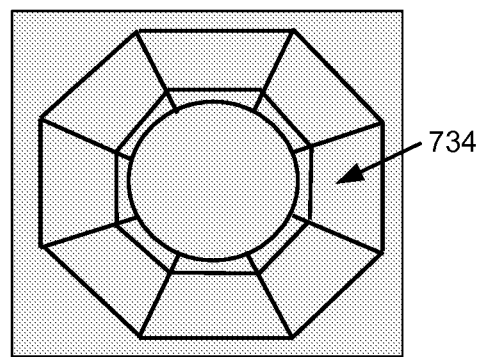

FIGS. 33a-33c illustrate an example of an endoscope having an imaging unit within a distal tip element, according to some embodiments of the present invention.

FIG. 33a depicts an ordinary distal tip element of a video endoscope 732 with a protruding camera unit 732.

FIG. 33b depicts the inner structure of the protruding camera unit 732. In one embodiment, the protruding camera unit 732 is configured as the device 100 described in FIG. 5, where eight FOVs cover the panoramic view. In another embodiment, four FOVs cover the panoramic view, as exemplified by FIGS. 32a-32c. According to a further embodiment, two imaging sensors are used: one sensor for the frontal FOV, and one sensor for the peripheral imaged FOVs. The two sensors may be positioned close to each other or back-to-back.

FIG. 33c illustrates an outer surface of the protruding camera unit 732. The outer surface of the protruding camera unit includes eight directional optical windows (generally 734). In a variant, four directional windows are associated with a light source and deliver light to the scene, while the remaining four directional windows are configured for receiving light from the scene. Alternatively, each directional window has a section for receiving light from the scene and another section for delivering light to the scene. In either case, the light source is inside the protruding camera unit. These embodiments enable the camera unit 732 to become independently operable with respect to the endoscope's distal tip.

Figure 34:
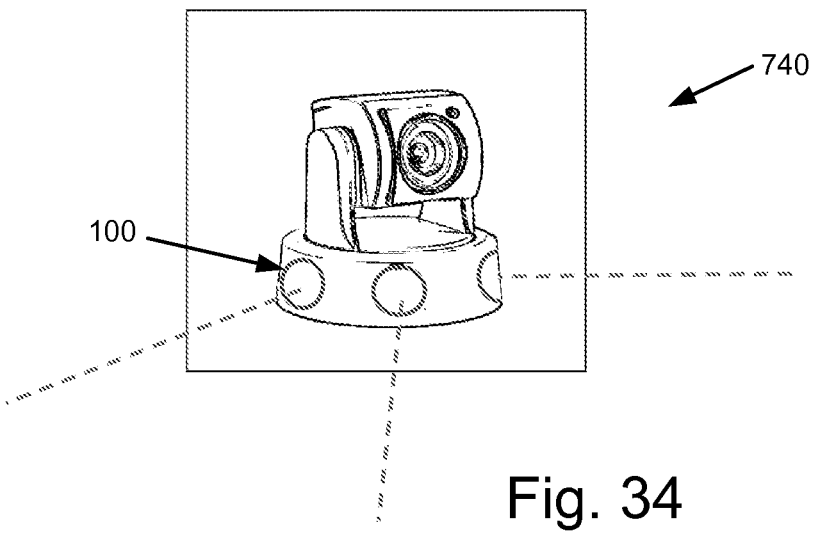
FIG. 34 is a drawing illustrating an example of a pan-tilt-zoom (PTZ) mechanism having the capability of multidirectional imaging, according to some embodiments of the present invention.

FIG. 34 is a drawing illustrating an example of a pan-tilt-zoom (PTZ) mechanism having the capability of multidirectional imaging, according to some embodiments of the present invention;

Current pan-tilt-zoom (PTZ) solutions in surveillance and security imaging often require wide field-of-regard (FOR) coverage, and quick response time in the detection and recognition of intruders and suspicious occurrences. Such requirements are typically achieved by PTZ configurations, whereby a camera is slewed horizontally and vertically by mechanical pan-tilt mechanisms, and object recognition is achieved by optical zoom. The problem with the PTZ concept is that continuous slewing and zooming is required in surveilling wide FORs, requiring video analytics in rapidly changing scenes and/or continuous manual operation and attention of an operator, both of which tend to be costly.

The PTZ mechanism 740 sports a multidirectional staring imaging capability, thanks to the device 100 on the bottom section of the PTZ mechanism. The device 100 may be configured as the device of FIGS. 2-5 or as the device of FIGS. 7-10, 12, 13, 15. In surveillance and security applications, such concurrent peripheral viewing may be used for peripheral object detection, while the pan-tilt-zoom mechanism is used for object discrimination and recognition. In video conferencing, the multidirectional imaging can be used to image the panoramic view around a meeting room table and the whiteboard, while the PTZ may be used for close-ups of people talking and communicating.

Figure 35C:
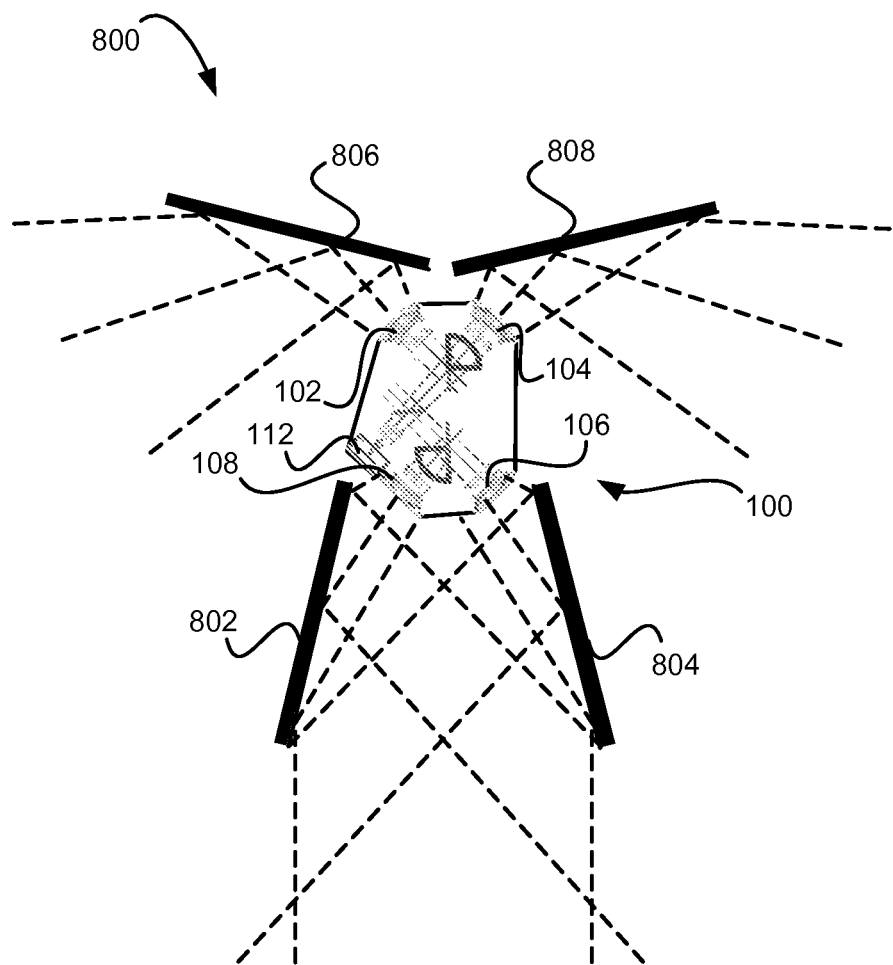

FIG. 35a illustrates a monitoring system for monitoring a fence/barrier, as known in the art. FIGS. 35b-35c are schematic drawings exemplifying a monitoring system for monitoring a fence/barriers, using a multidirectional imaging device of the present invention;

In FIG. 35a, the fence 750 is monitored by unidirectional cameras that must be within a certain range (e.g. 100 meters) of each other, to enable each camera to observe the next camera. A disadvantage of this setup lies in the fact that at each such inter-camera distance, intruders are to be detected and potentially recognized, thereby requiring sufficient optical performance at increased price per camera. This is especially true for day-night surveillance, where night vision uncooled thermal imaging cameras may be used. However, due to their increased price, the cost per meter of perimeter distance is very high. Another disadvantage lies in the fact that the camera pole installation is least protected as it is always observed by the previous camera on the perimeter, practically at the camera's maximum distance.

In FIG. 35b, multidirectional cameras 100 are used to monitor the perimeter. These cameras are configured according to any of the devices 100 of FIGS. 7-10, 12, 13, 15. An embodiment of such a camera provides for three concurrent or switched FOVs: two upper FOVs 756, directed in two opposite directions along a perimeter segment, and the third FOV just below and in the vicinity of the installed camera location. The three FOVs may have the same or different angular dimensions, depending on optical configuration of the camera or required FOV coverage and resolutions. Such embodiment provides a double coverage as it covers two elongated directions compared to one, and therefore achieves a two-fold reduction in price per perimeter distance. Another advantage is in that the immediate area in the vicinity of the camera installation is maximally protected, since this area is close to the camera and can therefore be viewed by a dedicated wide FOV. Moreover, an additional advantage is in that most intruder objects can be observed by two adjoining cameras (along the perimeter line) at a time, thereby resulting in improved detection performance based on correlating detections from such adjoining cameras. For example, an intruder target may be at a distance of 50 meters from one camera, and 150 meters from the adjoining camera along the perimeter. At the 50 meters distance, the respective camera will readily detect the target, and may indicate a small region of interest for the adjoining camera to seek the same target, thereby increasing its probability of detection as well. An additional advantage of such correlated detection, is that triangulation may be used to estimate the location of the target and match suitable detection processing parameters for such candidate target improved detection probability and lowered false alarm rate.

FIG. 35c illustrates a single multidirectional camera 100 on a pole. Optionally, two cameras 100 are associated with two external upper mirrors 806 and 808, and two external lower mirrors 802 and 804. The upper mirrors direct two oppositely-oriented FOVs to desired elongated sectors along the perimeter line. The sectors are directed in opposite directions with respect to the post and along a physical or virtual fence. In this manner, an entire elongated sector is covered by a single camera. Moreover, two additional FOVs are directed by two additional mirrors 802 and 804 to a region just below the camera and in the vicinity of the post. The lower FOVs cover the area around the post, such that any attempt to infiltrate the perimeter nearby the post or alternatively climbing on the post in an attempt to steal the camera would be easily detected.

It should be noted that the camera 100 can be configured according to the shape of the fence. For example, on straight sections of the fence, the two upper FOVs are directed at 180 degrees between each other. At corners, when two sections of the fence meet at a certain angle, the camera is configured so that the angle between the two upper FOVs matches the fence's angle. In this manner, each FOV follows a respective section of the fence.

Figure 36:
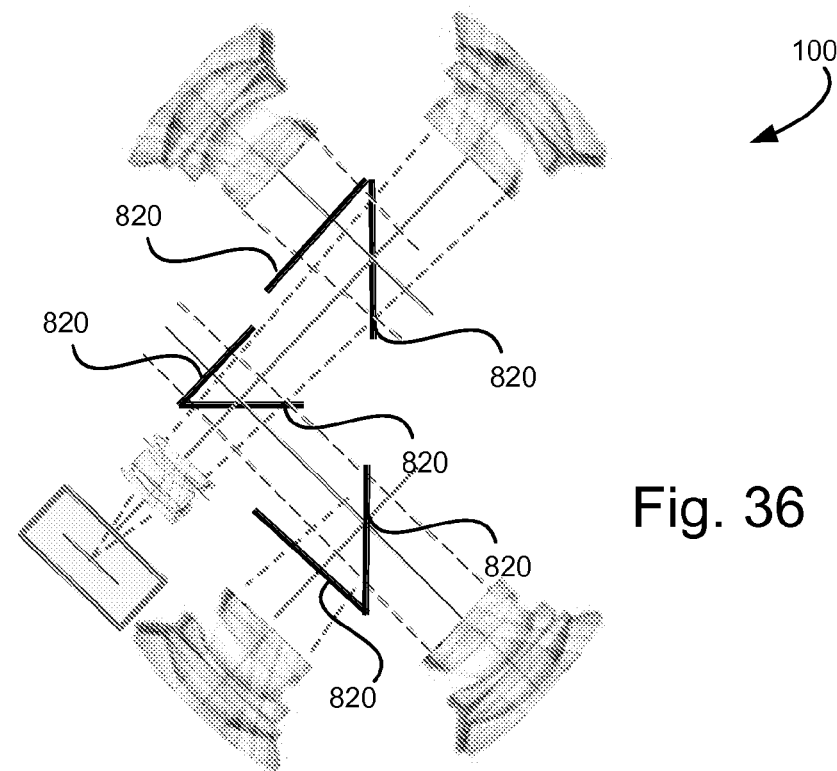
FIG. 36 is a schematic drawing illustrating a device of the present invention which utilizes multiple objective lenses to direct its multiple FOVs to desired imaged sectors.

FIG. 36 is a schematic drawing illustrating a device of the present invention which utilizes multiple objective lenses to direct its multiple FOVs to desired imaged sectors.

In FIG. 36, the guiding optics include discretely moving deflectors (mirrors), which are controllably moved in order to deflect light from each FOV to the sensor at different times.

Optionally, each mirror has two discrete positions, such that switching between certain configurations of the positions of the enables switching between all four FOVs.

In device most of the EM flux from a scene is retained as no beam splitters are used, and imaging and detection sensitivity are increased.

Figure 37A:
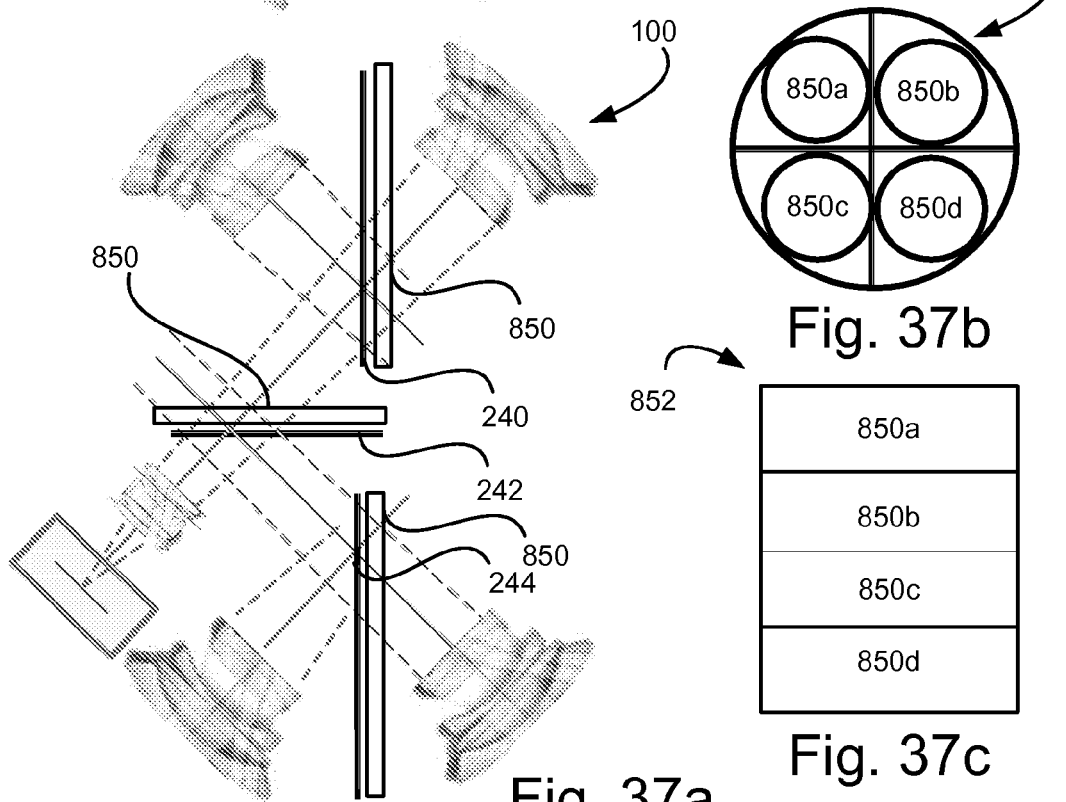
FIGS. 37a-37c are schematic drawings illustrating a device according to some embodiments of the present invention, in which the guiding optics includes rotating and/or sliding elements configured for affect the FOVs of the device.
Figure 37B:
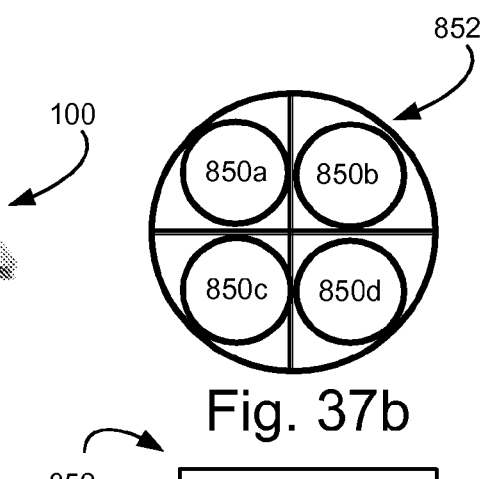
Figure 37C:
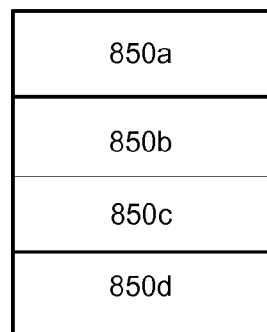

FIGS. 37a-37c are schematic drawings illustrating a device according to some embodiments of the present invention, in which the guiding optics includes rotating and/or sliding elements configured for affect the FOVs of the device.

In FIG. 37a, the device 100 may be configured according to any one of the devices of FIGS. 7-10, 12, 13, 15. The device 100 includes FOV affecting elements 850 joined to the beam splitters 240-244, or located in the vicinity of the beam splitters, along the optical path of the EM radiation. In a variant, the beam splitters are absent, and the FOV affecting elements are located in the place of the beam splitters. These elements are optical elements which manipulate EM radiation and change its characteristics and/or optical path in order to affect the characteristics of the imaged FOV. Such elements may include beam splitter, mirror, grating, disperser, optical filter, transparency etc.

Optionally, groups of FOV affecting elements are part of a sliding and/or rotating device, which can be moved in order to place a desired FOV-affecting element along the optical path of the EM radiation. An example of a rotating device 852 is shown in FIG. 37b. The device 852 includes four FOV-affecting elements 850a-850d. Rotation of the device 852 changes the positions of the FOV-affecting elements and enables selection of which element is to be located along the optical path. An example of a sliding device 852 is shown in FIG. 37c. The FOV affecting elements are disposed near each other along a vertical axis. Sliding to the device 852 along the vertical axis changes the positions of the elements 850a-850d, and enables selection of which element is to be located along the optical path. It should be noted that the FOV affecting elements may be disposed along a horizontal axis. In that case, the positions of the elements 850a-850d may be changed by sliding the device 852 along the horizontal axis.

Figure 38:
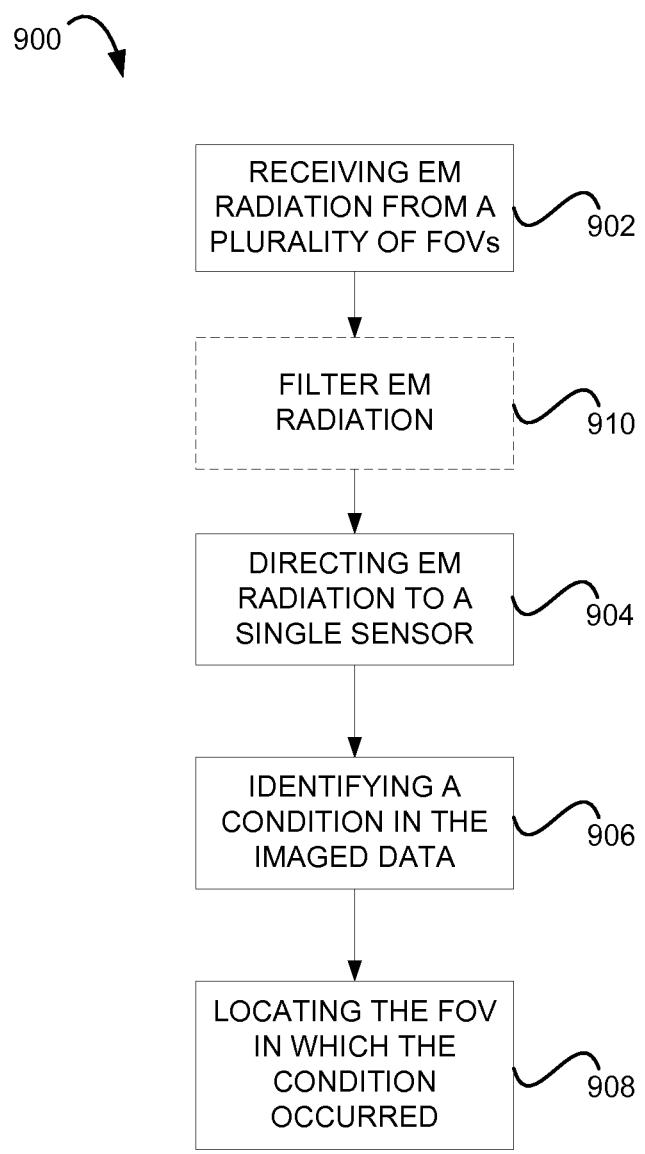
FIG. 38 shows a flowchart of an example of a method of the invention for determining certain condition(s) in a plurality of scenes (e.g. locating an event) while monitoring the scenes with a plurality of FOVs.

Referring now to FIG. 38, a flowchart 900 illustrates a method for locating an event while monitoring a plurality of FOVs.

At 902, EM radiation portions are received from respective FOVs. An event of interest occurs in one or more of the FOVs. An event occurs in one or more of the FOVs. At 904 the EM radiation portions are directed toward a single sensor. The sensor generates image data. The image includes a condition, which corresponds to the event. In some embodiments, the directing is such that radiation from all the FOVs illuminates the sensor simultaneously. In some embodiments, the directing is such that radiation from each FOV illuminates the sensor at the same time.

At 906, the image data from the sensor is analyzed, and a condition corresponding to the event is identified. At 908, the portion of electromagnetic radiation (and therefore the FOV from which it is collected) corresponding to the image data sporting the condition is identified. The identification may be implemented in many manners.

In some embodiments of the present invention, different portions of EM radiation are guided to respective sections of the sensor, as described above. In such case, the FOV where the event occurred is identified by identifying the section of the sensor which generated the data sporting the condition.

In some embodiments of the present invention, each portion of EM radiation is filtered in a unique manner, at 910. The filter may be a time filter or an optical filter, as explained above.

In some embodiments, different portions of EM radiation are guided to the same section of the sensor at different times (via a time filter). Therefore, a time point can be identified, in which the sensor generated the data sporting the condition. Therefore the FOV from which the EM radiation reached the sensor at that time point is the FOV in which the event occurred.

In some embodiments, all the EM radiation portions are guided to the same section of the sensor simultaneously, and the sensor generates a first piece of combined image data in which the condition is present. In one embodiment, the a time filter is activated, in order to guide different portions of EM radiation to the same section of the sensor at different times, so that the sensor can generate a sequence of second data pieces, each corresponding to a different FOV. The second data pieces of the sequence are then compared to the first combined image data piece, and the second data piece sporting the condition is identified. Because each second data piece corresponds to a respective FOV, the FOV in which the event occurred can be identified.

In some embodiments of the present invention, the filter is an optical filter (e.g., bandpass filter, diffractive filter, dispersive filter. In such case, the FOV is identified by recognizing the optical filtering to which the radiation from which the image data sporting the event has been subjected to.

The invention claimed is:

1. An imaging system comprising:
    a device for multidirectional imaging, the device comprising a multidirectional imaging unit defining a plurality of fields of view (FOVs) and being configured for collecting a plurality of electromagnetic (EM) radiation portions from a plurality of scenes, each scene being imaged with a respective FOV, a sensor unit comprising at least one sensor configured for receiving EM radiation and generating image data indicative thereof, and guiding optics configured for receiving at least a part of the collected EM radiation portions and directing them onto the sensor unit, said guiding optics being configured for guiding EM radiation from each FOV onto a respective section of the sensor; and
    a control unit configured for receiving image data from the sensor unit, processing and analyzing the image data and generating data indicative of a certain condition in one or more of the FOVs, said control unit being configured for identifying the FOV that generated image data associated with the identified condition, by locating the section of the sensor which generated the imaged data associated with the condition.

2. The device of claim 1, wherein the guiding optics comprises a plurality of deflectors each located in an optical path of propagation of the respective collected EM radiation portion and being configured for directing at least part of said collected EM radiation portion onto the respective section of the sensor.

3. The device of claim 1, comprising a plurality of refractive units configured for focusing each of the collected EM radiation portions onto the respective section of the sensor.

4. The device of claim 1, further comprising at least one light source configured for illuminating one or more of the scenes within the FOVs.

5. The An imaging system comprising:
    a device for multidirectional imaging, the device comprising a multidirectional imaging unit defining a plurality of fields of view (FOVs) and being configured for collecting a plurality of electromagnetic (EM) radiation portions from a plurality of scenes, each scene being imaged with a respective FOV, a sensor unit comprising at least one sensor configured for receiving EM radiation and generating image data indicative thereof, and guiding optics configured for receiving at least a part of the collected EM radiation portions and directing them onto the sensor unit, said guiding optics being configured for guiding EM radiation from different FOVs onto the same section of the sensor, the guiding optics further comprising a plurality of diffraction grating filters, each diffraction grating filter being associated with one of the FOVs and being oriented in a unique angle; and
    a control unit configured for receiving image data from the sensor unit, processing and analyzing the image data and generating data indicative of a certain condition identified in one or more of the FOVs, said control unit being configured for determining the FOV corresponding to the identified condition, by determining orientation of image components of the image data associated with the identified condition.

6. The device of claim 5, wherein the multidirectional imaging unit comprises a plurality of light collecting elements arranged in a spaced apart relation on an outer surface of a housing of the imaging unit.

7. The device of claim 6, wherein the light collecting elements comprise have at least one of the following configurations: (1) comprise lens elements; (2) comprise apertures or optical windows made in the outer surface of the housing.

8. The device of claim 6, wherein the light collecting elements comprise apertures or optical windows made in the outer surface of the housing, the device comprising one or more objective lens arrangements located in an optical path of EM radiation propagating from the guiding optics to the sensor unit.

9. An imaging system comprising:
    a device for multidirectional imaging, the device comprising a multidirectional imaging unit defining a plurality of fields of view (FOVs) and being configured for collecting a plurality of electromagnetic (EM) radiation portions from a plurality of scenes, each scene being imaged with a respective FOV, a sensor unit comprising at least one sensor configured for receiving EM radiation and generating image data indicative thereof, and guiding optics configured for receiving at least a part of the collected EM radiation portions and directing them onto the sensor unit, said guiding optics being configured for guiding EM radiation from different scenes onto the same section of the sensor, the guiding optics further comprising a plurality of temporal filters configured for selectively preventing EM radiation from one, or more of the FOVs from reaching the sensor at different times; and a control unit configured for receiving image data from the sensor unit, processing and analyzing the image data and generating data indicative of a certain condition in one or more of the FOVs, said control unit being configured for determining the FOV corresponding to the identified condition, by identifying a time point in which the EM radiation that generated the imaged data associated with the condition was received.

10. The device of claim 9, wherein the temporal filters have at least one of the following configurations: the temporal filters comprise a plurality of controllably movable opaque shutters; and the temporal filter comprise a plurality of controllably movable beam splitters.

11. The system of claim 9, wherein said control unit is configured for identifying of the time point by carrying out the following:
  generating a first piece of image data indicative of EM radiation from all FOVs illuminating the sensor simultaneously;
  generating a sequence of second image data pieces, each piece being indicative of EM radiation from a respective FOV illuminating the sensor;
  comparing the first piece of image data with the image data pieces of the sequence, to identify the piece of second image data corresponding sporting to the condition.

12. An imaging system comprising:
a device for multidirectional imaging, the device comprising a multidirectional imaging unit defining a plurality of fields of view (FOVs) and being configured for collecting a plurality of electromagnetic (EM) radiation portions from a plurality of scenes, each scene being imaged with a respective FOV, a sensor unit comprising at least one sensor configured for receiving EM radiation and generating image data indicative thereof, and guiding optics configured for receiving at least a part of the collected EM radiation portions and directing them onto the sensor unit, said guiding optics being configured for guiding EM radiation from different light collecting elements onto the same section of the sensor, the guiding optics further comprising a plurality of temporal filters configured for selectively preventing electromagnetic radiation from one, or more of the FOVs from reaching the sensor at different times; and a control unit configured for receiving image data from the sensor unit, processing and analyzing the image data and generating data indicative of a certain condition in one or more of the FOVs, said control unit being configured for determining the FOV corresponding to the identified condition, by separately analyzing subsets of the image data corresponding to the collected EM radiation from each FOV, and identifying the condition in the subset of data corresponding to the FOV.

* * * * *